US010800880B2

(12) United States Patent
Feng et al.

(10) Patent No.: US 10,800,880 B2
(45) Date of Patent: Oct. 13, 2020

(54) USE OF ADDITIVES TO FINE-TUNE THE COMPOSITION OF CARBONATE UNITS IN A POLYMER FORMED BY COPOLYMERIZATION OF CO2 WITH EPOXIDE: APPLICATION TO THE SYNTHESIS OF POLYCARBONATE-BASED BLOCK COPOLYMERS AND OF TELECHELICS

(71) Applicant: King Abdullah University of Science and Technology, Thuwal (SA)

(72) Inventors: Xiaoshuang Feng, Thuwal (SA); Dongyue Zhang, Thuwal (SA); Yves Gnanou, Thuwal (SA); Nikolaos Hadjichristidis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/563,269

(22) Filed: Sep. 6, 2019

(65) Prior Publication Data

US 2019/0390008 A1    Dec. 26, 2019

Related U.S. Application Data

(63) Continuation of application No. 15/571,631, filed as application No. PCT/IB2016/053552 on Jun. 15, 2016, now Pat. No. 10,450,412.
(Continued)

(51) Int. Cl.
*C08G 64/34* (2006.01)
*C08G 64/32* (2006.01)
(Continued)

(52) U.S. Cl.
CPC ............. *C08G 64/34* (2013.01); *C08G 64/32* (2013.01); *C08G 81/00* (2013.01); *C08K 5/057* (2013.01);
(Continued)

(58) Field of Classification Search
CPC ........ C08G 64/34; C08G 81/00; C08K 5/057; C08K 5/19; C08K 5/53; C08K 5/5399
See application file for complete search history.

(56) References Cited

U.S. PATENT DOCUMENTS 4,746,726 A    5/1988  Evans et al.
5,952,457 A    9/1999  Kouno et al.
(Continued)

FOREIGN PATENT DOCUMENTS

CN    103936976 A    7/2014
WO    2009130470 A1  10/2009
(Continued)

OTHER PUBLICATIONS

Coates, et al., "Discrete Metal-Based Catalysts for the Copolymerization of CO2 and Epoxides: Discovery, Reactivity, Optimization, and Mechanism", Angew. Chem. Int. Ed. 43, 2004, 6618-6639.
(Continued)

*Primary Examiner* — Shane Fang
(74) *Attorney, Agent, or Firm* — Billion & Armitage; Gregory S. Schwartz

(57) ABSTRACT

Embodiments of the present disclosure describe a method of making a polycarbonate, comprising contacting one or more cyclic monomers and carbon dioxide in the presence of one or more of a Lewis acid catalyst, an initiator, and an ionic liquid; and agitating, sufficient to copolymerize the one or more cyclic monomers and carbon dioxide to create a polycarbonate. Embodiments of the present disclosure further describe a method of controlling a polymer composi-
(Continued)

tion, comprising contacting one or more cyclic monomers and carbon dioxide; adjusting an amount of one or more of a Lewis acid catalyst, an ionic liquid, and an initiator in the presence of the one or more cyclic monomers and carbon dioxide, sufficient to selectively modify a resulting polycarbonate; and agitating, sufficient to copolymerize the one or more cyclic monomers and carbon dioxide to create the polycarbonate.

18 Claims, 14 Drawing Sheets

Related U.S. Application Data

(60) Provisional application No. 62/319,883, filed on Apr. 8, 2016, provisional application No. 62/175,556, filed on Jun. 15, 2016.

(51) Int. Cl.
*C08G 81/00* (2006.01)
*C08K 5/057* (2006.01)
*C08K 5/19* (2006.01)
*C08K 5/53* (2006.01)
*C08K 5/5399* (2006.01)

(52) U.S. Cl.
CPC .............. *C08K 5/19* (2013.01); *C08K 5/53* (2013.01); *C08K 5/5399* (2013.01)

(56) References Cited

U.S. PATENT DOCUMENTS

| | | |
|---|---|---|
| 6,713,599 B1 | 3/2004 | Hinz et al. |
| 6,815,529 B2 | 11/2004 | Zhao et al. |
| 6,844,287 B2 | 1/2005 | Meng et al. |
| 7,304,172 B2 | 12/2007 | Coates et al. |
| 8,093,351 B2 | 1/2012 | Coates et al. |
| 2011/0207909 A1 | 8/2011 | Jeong et al. |

FOREIGN PATENT DOCUMENTS

| | | |
|---|---|---|
| WO | 2011144523 A1 | 11/2011 |
| WO | 2012121508 | 9/2012 |
| WO | 2014178442 A1 | 11/2014 |
| WO | 2016203408 A1 | 12/2016 |

OTHER PUBLICATIONS

Cowman, et al., "Multicomponent Nanomaterials with Complex Networked Architectures from Orthogonal Degradation and Binary Metal Backfilling in ABC Triblock Terpolymers", J. Am. Chem. Soc. 2015, 137, 6026-6033.
Darensbourg, "Making Plastics from Carbon Dioxide: Salen Metal Complexes as Catalysts for the Production of Polycarbonates from Epoxides and CO2", Chem. Rev. 107, 2007, 2388-2410.
Esswein, et al., "Polymerization of Ethylene Oxide with Alkyllithium Compounds and Phosphazene Base "tBu-P4"**", Angew. Chem. Int. Ed. Engl. 35, No. 6, 1996, 623-625.
Fiorani, et al., "Sustainable conversion of carbon dioxide: the advent of organocatalysis", Green Chemistry, (2014) 10.1039/C4GC01959H).
Herzberger, et al., "Polymerization of Ethylene Oxide, Propylene Oxide, and Other Alkylene Oxides: Synthesis, Novel Polymer Architectures, and Bioconjugation", Chem. Rev. 116, 2016, 2170-2243.
Hsieh, et al., "Anionic Polymerization Principles and Practical Applications", Marcel Dekker, Inc., 1996, 5.
Ikpo, et al., "Aluminium coordination complexes in copolymerization reactions of carbon dioxide and epoxides", Organometallics, 2012, 31, 8145-8158.
Ikpo, et al., "Aluminum coordination complexes in copolymerization reactions of carbon dioxide and epoxides", Dalton Trans., 42, 2013, 8998-9006.
Inoue, et al., "Copolymerization of Carbon Dioxide and Epoxide", Polymers Letteres, vol. 7, 1969, 287-292.
Kember, et al., "Catalysts for CO2/Epoxide Copolymerisation", Chem. Commun., 2011, 47, 141.
Kuran, et al., "Epoxide Polymerization and Copolymerization with Carbon Dioxide Using Diethylaluminum Chloride-25,27-Dimethoxy-26,28-Dihydroxy-p-tert-Butyl-Calix[4]Arene System as a New Homogeneous Catalyst", J.M.S.—Pure Appl. Chem., A35(3), 1998, 427-437.
Lu, et al., "Cobalt catalysts for the coupling of CO2 and epoxides to provide polycarbonates and cyclic carbonates", Chem. Soc. Rev., 41, 2012, 1462-1484.
Maeda, et al., "Recent progress in catalytic conversions of carbon dioxide", Ema. Catal. Sci. Technol., 2014,4, 1482-1497.
Mikkelsen, et al., "The teraton challenge. A review of fixation and transformation of carbon dioxide", Energy Environ. Sci., 3, 2010, 43-81.
Roos, et al., "Grignard-based anionic ring-opening polymerization of propylene oxide activated by triisobutylaluminum", European Polymer Journal 70, 2015, 240-246.
Sugimoto, et al., "Copolymerization of Carbon Dioxide and Epoxide", Journal of Polymer Science: Part A: Polymer Chemistry, vol. 42, 2004, 5561-5573.
Sujith, et al., "A Highly Active and Recyclabel Catalytic System for CO2/Propylene Oxide Copolymerization**", Angew. Chem. Int. Ed. 47, 2008, 7306-7309.
Sun, et al., "Development in the green synthesis of cyclic carbonate from carbon dioxide using ionic liquids", Journal of Organometallic Chemistry, 690, 2005, 3490-3497.
Sun, et al., "Ionic Liquids in Green Carbonate Synthesis" In: "Ionic Liquids-Classes and Properties", Oct. 10, 2011, 303-306.
Varghese, et al., "Incorporation of ether linkage in CO2/propylene oxide copolymerization by dual catalysis", Polyhedron 32, 2012, 90-95.
Wang, et al., "Carbon Dioxide Capture by Superbase-Derived Protic Ionic Liquids", Angew. Chem. Int. Ed., 49, 2010, 5978-5981.
Xu, et al., "Effects of imidazolium salts as cocatalysts on the copolymerization of CO2 with epoxides catalyzed by (salen) Cr I I Cl complex", Polymer, Elsevier Science Publishers B.V. GB, Jun. 29, 2017, 3921-3924.
Zevaco, et al., "Aluminum bisphenoxides: Promising challengers for a catalyzed copolymerization of cyclohexene oxide with CO2", Catal. Today, 115, 2006, 151-161.
Zevaco, et al., "Aluminum triisopropoxide: An inexpensive and easy-to-handle catalyst of the copolymerisation of cyclohexene oxide with CO2", Green Chem., 7, 2005, 659-666.
Zhang, et al., "Metal-Free Alternating Copolymerization of CO2 with Epoxides: Fulfilling "Green" Synthesis and Activity", J.Am. Chem.Soc. 138, 2016, 11117-11120.
Search Report and Written Opinion for PCT/IB2016/053552, dated Aug. 30, 2016.

poly(cyclohexene carbonate) initiated by LiBr

USE OF ADDITIVES TO FINE-TUNE THE COMPOSITION OF CARBONATE UNITS IN A POLYMER FORMED BY COPOLYMERIZATION OF CO2 WITH EPOXIDE: APPLICATION TO THE SYNTHESIS OF POLYCARBONATE-BASED BLOCK COPOLYMERS AND OF TELECHELICS

BACKGROUND

Carbon dioxide ($CO_2$) is an abundant, inexpensive, and non-toxic renewable resource for the production of value-added chemicals and materials. Chemical fixation of carbon dioxide is an important research field of green chemistry. Alternating copolymerization of carbon dioxide-based polycarbonate is one of its most important applications. This polymer not only has excellent barrier properties to oxygen and water, but also has excellent biocompatibility and biodegradability. Polycarbonates can be used as engineering plastics, non-polluting materials, disposable medical and food packaging, adhesives and composite materials.

One of the promising approaches to harness the potential of $CO_2$ is to copolymerize of $CO_2$ with epoxides to produce polycarbonates. The most successful $CO_2$-epoxide copolymerization systems are based on transition metal Cr(III), Co(III) or Zn(II) complexes with Schiff base ligands. In the case of copolymerization of $CO_2$ and propylene oxide (PO), totally alternated poly(propylene carbonate) (PPC) with molar mass up to 300,000 g $mol^{-1}$ could be prepared using a recyclable catalyst (salen) Co(III) (S. Sujith, et. al, Angew. Chem. Int. Ed., 2008, 47, 7306). To improve the thermal and mechanical properties of most investigated polycarbonates, (PPC) and poly(cyclohexenecarbonate) (PCHC), or endow degradable properties to other polymeric materials, incorporation of two or more other blocks into the polycarbonates to form block copolymers is indispensable. One strategy is the copolymerization of $CO_2$ with other epoxides which could afford polycarbonate block copolymers. Through sequential addition of functionalized cyclohexene monomer, Coates, et. al. synthesized a multiblock polycyclohexene carbonate with different functional substituents at the cyclohexene ring with Zn(II) diiminate as catalyst (J. G. Kim, et. al., Macromolecules 2011, 44, 1110-1113). Similarly, Darensbourg et. al. reported that terpolymerization of propylene oxide, vinyl oxide and $CO_2$ provided random polycarbonate copolymers of various compositions depending on the feed ratios of the epoxide monomers catalyzed by binary and bifunctional (salen) Co(III) complexes, the vinyl group introduced could be crosslinked afterwards (D. J. Darensbourg, et. al., Polymer Chemistry 2014, DOI: 10.1039/c4py01612b). Due to the high selectivity of catalysts to one kind of epoxide monomer, other strategy had to be employed to get block copolymers other than polycarbonates. Using various polymers containing hydroxyl or carboxylic group as a chain transfer agents, Lee et. al. synthesized block copolymers of PPC, and poly(ethylene oxide), polytetrahydrofuran, polycaprolactone, polystyrene, etc. respectively (A. Cyriac, et al, Macromolecules 2010, 43, 7398-7401). Alternatively, Williams's and Lu's group reported the preparation of polycarbonate block copolymer in a two-step process, the end or side hydroxyl groups due to transfer or hydrolysis of polycarbonate produced in the first step, subsequently initiate the polymerization of lactide; ABA-type and grafted polycarbonate-b-polylactide were obtained respectively (M. R. Kember, et al, Polymer Chemistry 2012, 3, 1196-1201; Y. Liu, et al, Macromolecules 2014, 47, 1269-1276). Recently, Darensbourg have demonstrated a tandem catalytic approach for the synthesis of AB diblock copolymers containing poly(styrene carbonate) and polylactide, where the end hydroxyl group of macroinitiator was generated at the end of copolymerization of styrene oxide/ $CO_2$ copolymerization (G.-P. Wu, et al, J. Am. Chem. Soc. 2012,134, 17739-17745); in another strategy, they reported the synthesis of ABA-type PLA-PPO-PLA triblock copolymers in one pot, here, water was added along with the propylene oxide(PO)/$CO_2$ copolymerization process as a chain-transfer reagent (D. J. Darensbourg, G. P. Wu, Angew. Chem. Int. Ed. 2013, 52, 10602-10606).

Recently, more attention has been paid to green processes and catalysts based on main group metal complexes. With efficient catalysts such as Co(III) and Cr(III), the traces of metal residues inside the resin may result in toxic, colored, degradation issues that will affect their performance and limit their applications accordingly. In contrast, aluminum, one of the earliest investigated metal as catalyst since the discovery of copolymerization of $CO_2$ and epoxides, is earth-abundant, cheap, and biocompatible. More importantly, aluminum complexes are known to catalyze a wide range of other polymerization reactions, thus providing the possibility to expand $CO_2$ based block copolymers other than epoxides. In fact, due to the competitive homopolymerization of epoxides catalyzed by aluminum catalysts, more work needs to be done to improve the catalytic effects. Aluminum porphyrin complex and Schiff base complexes both could catalyze alternating copolymerization of $CO_2$ and epoxides, the catalytic efficiencies were quite low, and molar masses of obtained polycarbonates were below 10 Kg $mol^-$ 1(N. Ikpo, J. C. Flogeras, F. M. Kerton, Dalton Trans., 42, 2013, 8998-9006). As for aluminum alkoxides [(triisopropoxide (T. A. Zevaco, et. al. Green Chem., 2005, 7, 659-666); bisphenoxide (T. A. Zevaco, et. al. Catal. Today, 2006, 115, 151-161); calixarenoxide (W. Kuran, et. al. J. Macromol. Sci., Pure Appl. Chem., 1998, A35, 427-437)], these relatively simple coordination complexes, however, required high pressures, the achieved polymers were of low to moderate carbonate linkage with low molar mass. The only exception is the results reported by Kerton (N. Ikpo, et. al. Organometallics, 2012, 31, 8145-8158) that a relatively high molecular weight polymer (20.9 Kg mol−1) with 54% of carbon dioxide incorporation was achieved when aminephenoxide was used as catalyst.

The composition of carbonate linkage in these systems could be hardly fine-tuned once the catalysts for the copolymerization of $CO_2$ and epoxides are were chosen, which then yielded for each system a fixed percentage of carbonate linkage between 100% and a few percent. The only means in each of these systems to vary the percentage of carbonate linkage would thus be to vary the pressure of $CO_2$ or the temperature. For some purposes, polymers whose level of carbonate linkages could be easily varied may also be desirable. However, one example that allows tuning of the composition of carbonate linkage is reported by Lee et. al. who mixed two kinds of catalysts in different ratio, the propagation occurring through shuttling of the growing polymer chains between the two catalyst sites: Salen— cobalt(III) complex bearing four quaternary ammonium salts [a highly active poly(propylene carbonate) catalyst, 100% of carbonate linkage] and a double metal cyanide [DMC, a highly active poly(propylene oxide), 10% of carbonate linkage], copolymers with 10-67% of carbonates could be achieved (J. K. Varghese, et al, Polyhedron 2012, 32, 90-95).

SUMMARY

In general, embodiments of the present disclosure describe a method of making a polycarbonate, comprising contacting one or more cyclic monomers and carbon dioxide in the presence of one or more of a Lewis acid catalyst, an initiator, and an ionic liquid; and agitating, sufficient to copolymerize the one or more cyclic monomers and carbon dioxide to create a polycarbonate.

Embodiments of the present disclosure further describe a method of controlling a polymer composition, comprising contacting one or more cyclic monomers and carbon dioxide; adjusting an amount of one or more of a Lewis acid catalyst, an ionic liquid, and an initiator in the presence of the one or more cyclic monomers and carbon dioxide, sufficient to selectively modify a resulting polycarbonate; and agitating, sufficient to copolymerize the one or more cyclic monomers and carbon dioxide to create the polycarbonate.

Examples of the present disclosure describe the preparation of polyol and block copolymer initiated by bifunctional or macromolecular lithium or oxide salts in the presence of Lewis acid catalyst and cyclic monomers and carbon dioxide.

BRIEF DESCRIPTION OF THE DRAWINGS

The accompanying drawings illustrate non-limiting example embodiments of the invention.

DETAILED DESCRIPTION

Figure 1:
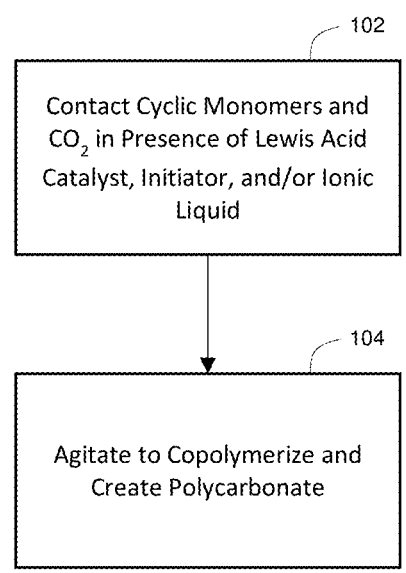
FIG. 1 illustrates a block flow diagram of a method of making a polycarbonate, according to one or more embodiments of this disclosure.

Common commercial problems with polycarbonates include laborious and costly catalyst preparation, as well as residues remaining in the resins. These problems may increase costs, create toxicity issues, and limit performance Importantly, there lacks a methodology to tune the carbonate contents for specific applications. The catalysts for the copolymerization of $CO_2$ and epoxides in the present disclosure are inexpensive and widely available, can tune the composition of obtained polycarbonates, and copolymerize with other cyclic monomers, such as lactide and carprolactones.

The methods and compositions disclosed herein provide inexpensive, commercially available, biocompatible Lewis acids as catalysts for copolymerization of carbon dioxide and cyclic monomers, such as epoxides. Further, the carbonate and polyether contents can be conveniently adjusted based on the feeding ratio of catalyst to initiator or together with amount of ionic liquid and lithium salts utilized. Polycarbonates can be modified or tuned according to embodiments of the invention to create two types of block copolymer structure, random and alternated copolymer with the carbonate composition from about 2% to about 100%, for example.

As embodiments of this disclosure discuss preparations of polycarbonate with different compositions and structures, which is also the precursor of polyurethane, results may find application in packaging, coatings, surfactant, and medical industries.

Definitions

As used herein, "polycarbonate" refers to a general class of polymers containing a carbonate moiety.

As used herein, "contacting" refers to bringing two or more components in proximity, such as physically, chemically, electrically, or some combination thereof. Mixing is an example of contacting.

As used herein, "agitating" refers to disturbing or moving components. Agitating can include stirring and shaking, for example.

As used herein, "catalyst" refers to a component that affects a rate or other quality of a reaction without itself undergoing any permanent chemical transformation. Trialkyl aluminum and trialky borane are examples of a catalyst.

As used herein, "ionic liquid" refers to a salt in a liquid state. In an ionic liquid, the ions are poorly coordinated and result in the liquids having low melting points. Ionic liquids can be derived from methylimidazolium and pyridinium ions, for example.

As used herein, "lithium salt" refers to a salt with lithium as a cation. They include inorganic and organic salts, and could participate in polymerization as an initiator or as additive to tune the polymerization activity of one or more monomers and carbon dioxide.

As used herein, "initiator" refers to a mono- or poly- (including macromolecular) alcoholic, phenolic, acidic salts with cations (lithium, sodium, potassium, cesium, ammonium, imidazolium, phosphazium) produced through deprotonation by different bases, salts, and other lithium salts additives. Bases include, but are not limited to, for example, imidazolium alkoxide, lithium alkoxide, lithium phenolate, and alkyllithium (including macromolecular alkoxide); salts include, but are not limited to, for example, imidazolium halide, lithium, sodium, potassium, halides, ammonium, tetraalkylammonium, tetraalkylphosphonium in halide, hydroxide, carbonate, and carboxylate; and other lithium salts additives include, but are not limited to, for example, lithium carbonate, LiOH, LiCO3, LiClO4, LiPF6, LiBF4, and lithium bis(trifluoromethane)sulfonamide (Tf2N). The initiator can include macromolecular salts, including, but not limited to, for example, one or more of macromolecular lithium salts. The initiator can include an anionic nucleophile.

As used herein, "epoxide" refers to a cyclic ether with a three-atom ring. Examples of epoxides include propylene oxide (PO) and cyclohexene oxide (CHO), and can be used as cyclic monomers.

Referring to FIG. 1, a block flow diagram of a method of making a polycarbonate is shown, according to one or more embodiments of this disclosure. One or more cyclic monomers and carbon dioxide are contacted 102 in the presence of one or more of a Lewis acid catalyst, an initiator, and an ionic liquid. The one or more cyclic monomers and carbon dioxide are agitated 104 to copolymerize and create a polycarbonate. The structure and terminal functionality of the polycarbonate can be adjusted by the initiator, including multifuntional and macromolecular type. Bifunctional, heterofunctional block copolymers can be created according to an embodiment of this disclosure.

The one or more cyclic monomers can include one or more epoxides, for example. In some embodiments, the one or more cyclic monomers can include one or more of epoxides, lactides, caprolactones, propylene oxides (PO), and cyclohexene oxides (CHO). In some embodiments, the one or more cyclic monomers can include one or more of epoxides, lactides, caprolactones, propylene oxides, cyclohexene oxides, ethylene oxides, and styrene oxides.

The Lewis Acid catalyst can include one or more of triisobutyl aluminum, triethyl borane, trialkyl aluminum, trimethyl borane, triisobutylborane, triphenylborane, trialkyl borane, dialkyl zinc, dialkyl magnesium, diethyl zinc, diethyl magnesium, and the ester forms thereof.

The initiator (anionic nucleophile) can include mono- and/or poly-alcoholic, phenolic, and acidic salts with cations produced through deprotonation by different bases, salts, and other lithium salts additives. The cations can include one or more of lithium, sodium, potassium, cesium, ammonium, imidazolium, and phosphonium. The bases can include, but are not limited to, one or more of imidazolium alkoxide, lithium alkoxide, lithium phenolate, and alkyllithium (including macromolecular alkoxide). The salts can include, but are not limited to, one or more of imidazolium halide, lithium, sodium, potassium, halides, ammonium, tetraalkylammonium, tetraalkylphosphonium in halide, hydroxide, carbonate, and carboxylate. Other lithium salts additives can include, but are not limited to, one or more of lithium alkoxide, lithium carbonate, lithium phenolate, lithium halide, LiOH, $LiCO_3$, $LiClO_4$, $LiPF_6$, $LiBF_4$, and lithium bis(trifluoromethane)sulfonamide ($Tf^2N$). The initiator can include one or more of lithium salts, imidazolium salts, and alkoxide salts. The initiator can include one or more of lithium benzoxide, lithium chloride, lithium bromide, lithium triethylene glycoxide, lithium glycoxide, lithium polystyrene, n-heterocyclic carbene, imidazolium chloride, potassium tertbutyloxide, tetrabutylammonium chloride, and benzene alcohol and phosphazene P2. The initiator can include deprotonated alkoxide using one or more of carbene and butyl lithium.

The ionic liquid can include a salt in a liquid state. The ionic liquid can include one or more of 1-butyl-3-methylimidazolium hexaflurophosphate (BMIM-PF6) and trioctyl-methylammonium bis(trifluoromethyl-sulfonyl)imide. The ionic liquid can include one or more of methylimidazolium and pyridinium ions. The ionic liquid can include one or more imidazolium-based ionic liquids with different counter ions, including, but not limited to, one or more of 3-Methyl-(4-9)-(fluoro)imidazolium Bis[(trifluoromethyl)sulfonyl] imide, 1-hexyl-3-methylimidazolium tris(penta fluoro propyl)trifluoro phosphate, and 1-pentyl-3-methyl imidazolium tris(nona fluoro butyl)] trifluoro-phosphate. The ionic liquid can include one or more ammonium-based ionic liquids with different counter ions, including, but not limited to, choline bis(trifluoromethylsulfonyl)imide, tetrabutyl ammonium docusate, peg-5-cocomonium methylsulphate. The ionic liquid can include one or more super-based derived protonic ionic liquids, including, but not limited to, methyl-triaza bicycloundacane (MTBD) and trifluoroethanol [MTBDH+] [TFE−]. The ionic liquid can include one or more polyionic liquids, including, but not limited to, one or more of poly (1-[(2-methacryloyloxy)ethyl]-3-butylimidazoliums, poly (1-ethyl-3-vinyl-imidazolium) bis(trifluoromethylsulfonyl) imide, N,N-dimetyl-N,N-diallylammonium bis(trifluoromethylsulfonyl) imide, and poly(diallyldimethylammonium chloride) solution.

Figure 2:
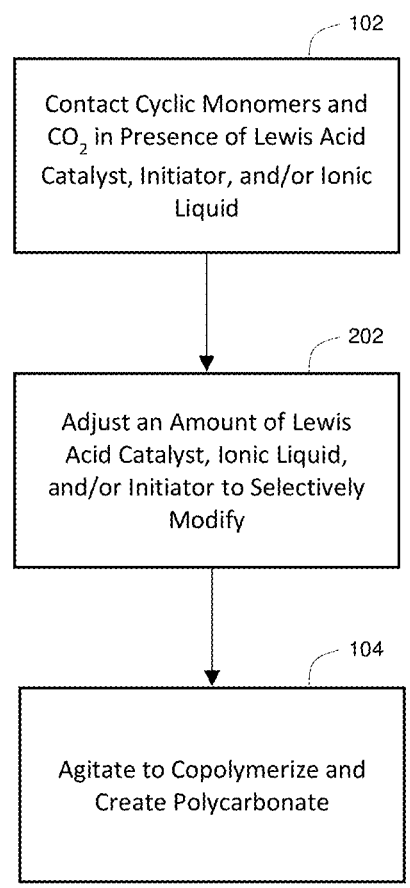
FIG. 2 illustrates a block flow diagram of a method of controlling a polymer composition, according to one or more embodiments of this disclosure.

Referring to FIG. 2, a block flow diagram of a method of controlling a polymer composition is shown, according to one or more embodiments of this disclosure. One or more cyclic monomers and carbon dioxide are contacted 102. An amount of one or more of a Lewis acid catalyst, an ionic liquid, and an initiator in the presence of the one or more cyclic monomers and carbon dioxide is adjusted 202, sufficiently to selectively modify a resulting polycarbonate. The one or more cyclic monomers and carbon dioxide are agitated 104 sufficiently to copolymerize and create the polycarbonate.

Adjusting 202 includes adding an excess, for example. Adjusting can also include modifying one or more of ratios of catalyst/ionic liquid, catalyst/initiator, catalyst/cyclic monomers, ionic liquid/cyclic monomer and initiator/cyclic monomer, polymerization pressure (1 atm to 50 atm), and temperature (ambient temperature to 120° C.). In one example, ratio of ionic liquid/cyclic monomer is increased to affect the solubility of carbon dioxide and the resulting carbonate percentage in the polycarbonate.

Selectively modifying includes one or more of modifying a ratio of blocks, modifying a gradient, introducing a terminal functional group, copolymerizing with other macromolecular initiates, affecting randomness of blocks, and altering a structure. Polycarbonates can be modified or tuned according to embodiments of the present invention to create two types of block copolymer structures, including a gradient and random copolymer with a carbonate composition from about 2% to about 100%, from about 5% to about 80%, and from about 10% to about 60%, for example. Selectively modifying includes increasing or decreasing a gradient in the copolymer, increasing or decreasing randomness of blocks, and increasing the amount of carbonate in the resulting copolymer, for example. By choosing appropriate alcohol, phenol, acid, heterofuntional polycarbonates, polyol, and block polycarbonate copolymers with polystyrene, polybutadiene, polyisoprene, poly(ethylene oxide) could be prepared, for example.

In some embodiments, a process of copolymerization of $CO_2$ and epoxides catalyzed by trialkyl aluminum or triethyl borane is shown. The synthetic process catalyzed by tri-isobutyl aluminum as an example is shown in scheme 1, initiated by deprotonated alkoxide using carbene or butyl lithium, or directly by imidazolium salts and lithium salts:

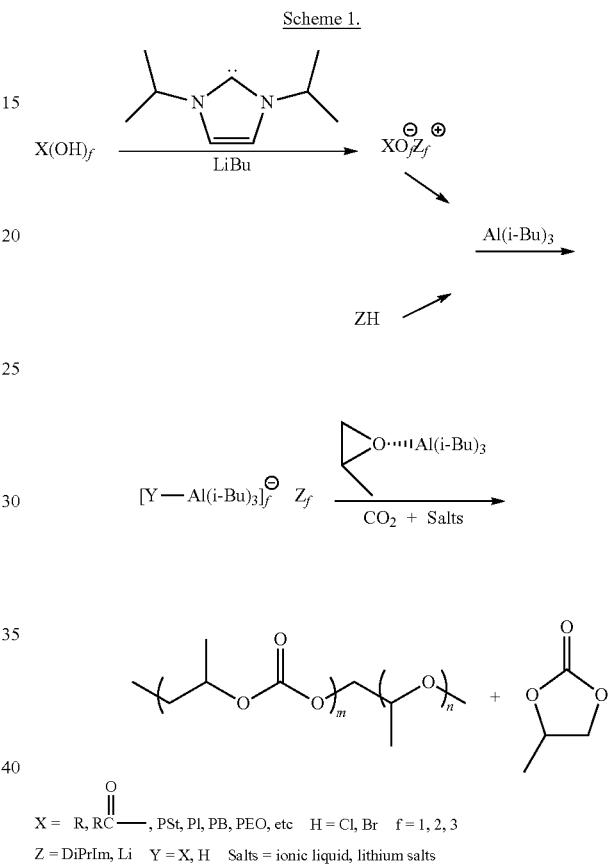

In the examples, three additives are used to tune or modify the composition of carbonates. One is the catalyst Al(iBu)$_3$, and the others are ionic liquid, lithium salts and $CO_2$-philic solvents. Ionic liquid could be: 1) Imidazolium based ionic liquids with different counter ion, 3-Methyl-(4-9)-(fluoro) imidazolium Bis[(trifluoromethyl)sulfonyl]imide, 1-hexyl-3-methylimidazolium tris(penta fluoro propyl)trifluoro phosphate and 1-pentyl-3-methyl imidazolium tris(nona fluoro butyl)] trifluoro-phosphate etc.; 2) Ammonium based ionic liquids with different counter ions, choline bis(trifluoromethylsulfonyl)imide, tetrabutyl ammonium docusate, peg-5-cocomonium methylsulphate etc. (ref: J. Phys. Chem. B, Vol. 111, No. 30, 2007); 3) Super based derived protonic ionic liquids, Methyl-triaza bicycloundacane (MTBD) and trifluoroethanol [MTBDH+] [TFE−] etc. (ref: Angew. Chem. Int. Ed. 2010, 49, 5978-5981); B) Polyionic liquids: poly(1-[(2-methacryloyloxyethyl]-3-butylimidazoliums, poly(1-ethyl-3-vinyl-imidazolium) bis(trifluoromethylsulfonyl) imide, N,N-dimetyl-N,N-diallylammonium bis(trifluoromethylsulfonyl) imide and poly(diallyldimethylammonium chloride) solution etc. (Electrochimica Acta, doi: 10.1016/j.electacta.2015.03.038)]. Lithium salts could be: lithium alkoxide, alkyllithium, lithium carbonate, lithium phenolate, lithium halide, LiOH, LiCO3, LiClO4, LiPF6, LiBF4, lithium bis(trifluoromethane)sulfonamide (Tf2N), etc. $CO_2$-philic solvents could be: THF, poly(ethylene glycol) dimethyl ether, polypropyleneglycol dimethylether, polydimethyl siloxane, etc (M. B. Miller, D. R. Luebke, R. M. Enick, Energy & Fuels 2010, 24, 6214-6219). Through different feeding ratios, different mean compositions and terminal functionality of polycarbonates and block copolymers initiated by other macromolecualar polyols (hydroxyl terminated polystyrene (PSt), polyisoprene (PI), polybutadiene (PI), poly(ethylene oxide) (PEO), for example) can be achieved. Not only the sequential polymerization of other cyclic monomers, such as lactide, caprolactone leading block copolymers, but also the copolymerization of the latter monomers with $CO_2$ can be contemplated.

EXAMPLE 1

Figure 3A:
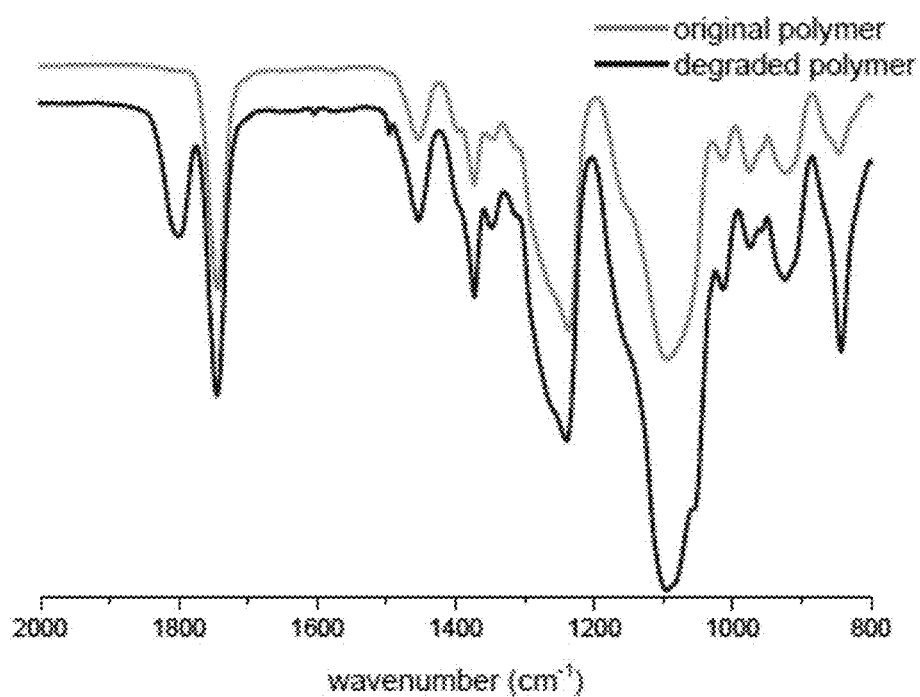
FIG. 3A illustrates a graphical view of an infrared (IR) degradation characterization of a prepared polymer initiated by N-heterocyclic carbene (NHC), according to one or more embodiments of this disclosure.
Figure 3B:
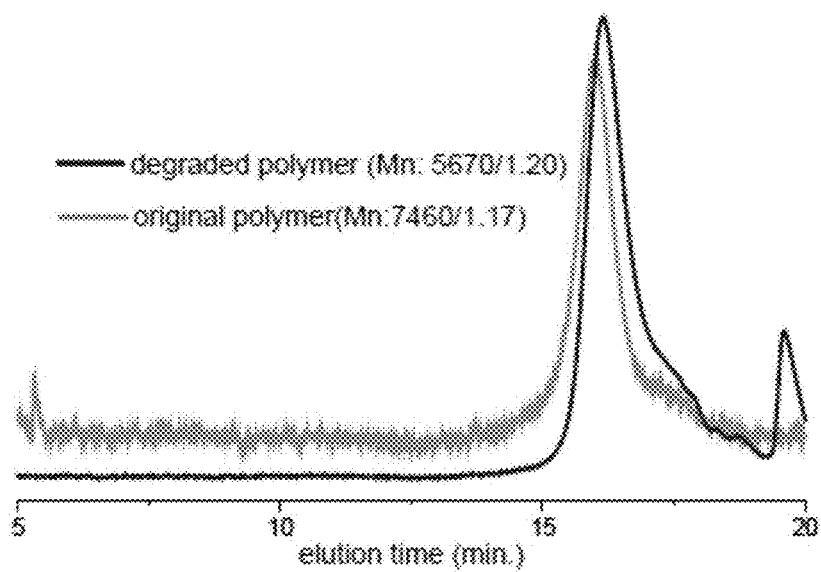
FIG. 3B illustrates a graphical view of a gel permeation chromatography (GPC) degradation characterization of a prepared polymer initiated by N-heterocyclic carbene (NHC), according to one or more embodiments of this disclosure.

A representative procedure of $CO_2$ copolymerization of propylene oxide with carbene catalyzed by triisobutyl aluminum was performed. Inside a glove box under argon, to a pre-dried 50 mL of autoclave fitted with magnetic stirring bar, 10.8 mg of 2-phenyl ethanol (86 µmol) was added followed by 1.5 mL of toluene. 1,3-diisopropylimidazol-2-ylidene in toluene (86 µmol) was added to deprotonate the alcohol. Ten minutes later, 246 mg of ionic liquid (10 eq.), 1-butyl-3-methylimidazolium hexaflurophosphate and triisobutyl aluminum in toluene (103 µmol) were added into the autoclave. To prevent homopolymerization before charging $CO_2$, 1.5 mL of propylene oxide was charged into a separate small vial which was put inside the autoclave. $CO_2$ was charged into the sealed autoclave to 10 bar. Then, copolymerization was carried out under vigorous stirring at room temperature. After the reaction time, the carbon dioxide slowly vented, and the reaction quenched with drops of 10% HCl. Toluene was used to extract the polymer to remove the added ionic liquid. The organic solution was concentrated and dried for characterization. The results were listed in Table 1. The obtained polycarbonates (non-quenched polymer crude mixture) exhibited degradation phenomena characterized by IR (See FIG. 3A illustrating a graphical view of an IR degradation characterization of a prepared polymer initiated by N-heterocyclic carbene (NHC), according to one or more embodiments of this disclosure), GPC (See FIG. 3B illustrating a graphical view of a gel permeation chromatography (GPC) degradation characterization of a prepared polymer initiated by N-heterocyclic carbene (NHC), according to one or more embodiments of this disclosure), suggesting their gradient structure.

TABLE 1

Gradient poly(ether carbonate) copolymer initiated by carbene system

| EXP* | Initiator (1.0) | iBu3Al (Eq.) | IL (Eq.) | solvent | PO | CO2 (atm) | Temp. | time | Conv. (% PO) | PC (mol %) | Selectivity (%) | GPC (×10$^3$) |
|---|---|---|---|---|---|---|---|---|---|---|---|---|
| 1 | PhEOH/NHC | 0 | 0 | Tol | 7.2M | 10 | 60 | | | 0 | 0 | |
| 2 | PhEOH/NHC | 1.0 | 0 | Tol | 7.2M | 10 | 60 | 3 ds | 51 | 26 | 30 | 1.39/2.28 |
| 3 | PhEOH/NHC | 1.5 | 0 | Tol | 7.2M | 10 | R.t. | 16 + 10 (40° C.) | 91 | 1.1 | 64 | 14.7/1.18 |
| 4 | PhEOH/NHC | 1.2 | 5 | Tol | 7.2M | 10 | R.t. | 16 + 8 (40° C.) | 12 | 42 | 73 | 1.57/1.37 |
| 5 | PhEOH/NHC | 1.5 | 10 | Tol | 7.2M | 10 | R.t. | 16 | 26 | 27 | 85 | 6.46/1.10 |
| 6 | PhEOH/NHC | 1.2 | 20 | Tol | 7.2M | 10 | R.t. | 3 ds | 36 | 50 | 99.3 | 5.82/1.16 |
| 7 | PhEOH/NHC | 1.2 | 5 | Tol. | 7.2M | 10 | r.t. | 16 h | 2.5 | 51 | >99% | |
| 8 | PhEOH/NHC | 1.2 | 8 | Tol. | 7.2M | 10 | r.t. | 16 h | 4.9 | 58 | 93% | |
| 9 | PhEOH/NHC | 1.2 | 10 | Tol. | 7.2M | 10 | r.t. | 16 h | 6.9 | 54 | >99% | |
| 11 | PhEOH/NHC | 1.2 | 20 | Tol. | 7.2M | 10 | r.t. | 16 h | 10.3 | 38 | 99% | |
| 12 | PhEOH/NHC | 5.0 | 10 | Tol. | 7.2M | 10 | r.t. | 16 h | 26.2 | 37 | 97% | |
| 13 | PhEOH/NHC | 3.0 | 10 | Tol. | 7.2M | 10 | r.t. | 16 h | 19.3 | 42 | 97% | |
| 14 | PhEOH/NHC | 2.0 | 10 | Tol. | 7.2M | 10 | r.t. | 16 h | 9.9 | 46 | 97% | |
| 15 | Acetic acid/NHC | 1.2 | 10 | Tol. | 7.2M | 10 | r.t. | 16 h | 3.5 | 48 | 99% | |
| 16 | PhEOH/NHC | 1.2 | 10 | DCM | 7.2M | 10 | r.t. | 16 h | 0.8 | 53 | 98% | |
| 17 | PhEOH/NHC | 1.2 | 10 | Dioxane | 7.2M | 10 | r.t. | 16 h | 5.8 | 50 | 98% | |
| 18 | PhEOH/NHC | 1.2 | 10 | THF | 7.2M | 10 | r.t. | 16 h | 9.3 | 44 | >99% | |
| 19 | PhEOH/NHC | 1.2 | 10 | Cyclic carbonate | 7.2M | 10 | r.t. | 16 h | Trace | 52 | | |
| 20 | PhEOH/NHC | 1.2 | 10 | hexane | 7.2M | 10 | r.t. | 16 h | 6.4 | 45 | 97% | |
| 21 | PhEOH/NHC | 2.0 | 10 | Tol. | 5.6M | 10 | r.t. | 16 h | 84.0 | 33 | >99% | |
| 22 | PhEOH/NHC | 1.2 | 10 | Tol. | 5.6M | 30 | r.t. | 16 h | 10.0 | 16 | >99% | |

*Exp. 1-20, propylene oxide as monomer, 21-22, cyclohexene oxide as monomer.

EXAMPLE 2

Figure 4:
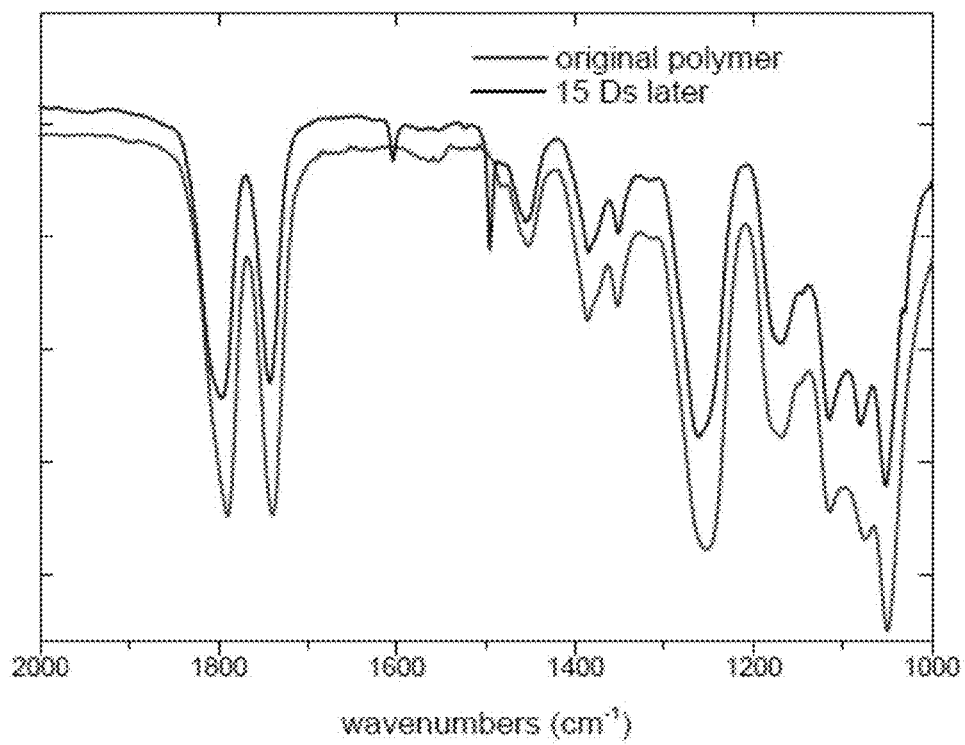
FIG. 4 illustrates a graphical view of an infrared (IR) degradation test of prepared polymer initiated by imidazolium chloride, according to one or more embodiments of this disclosure.
Figure 5A:
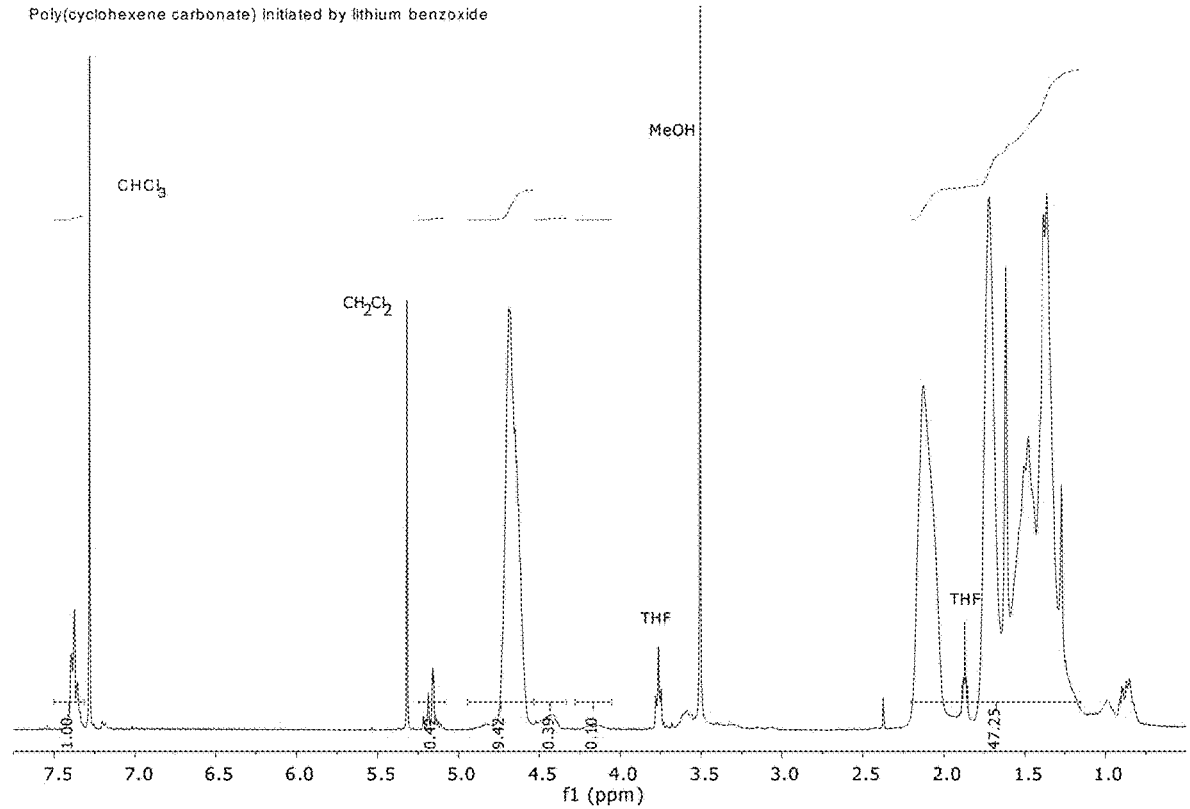
FIG. 5A illustrates a graphical view of NMR characterization of prepared poly(cyclohexene carbonate) initiated by Lithium benzoxide and catalyzed by triisobutyl aluminum, according to one or more embodiments of this disclosure.
Figure 5B:
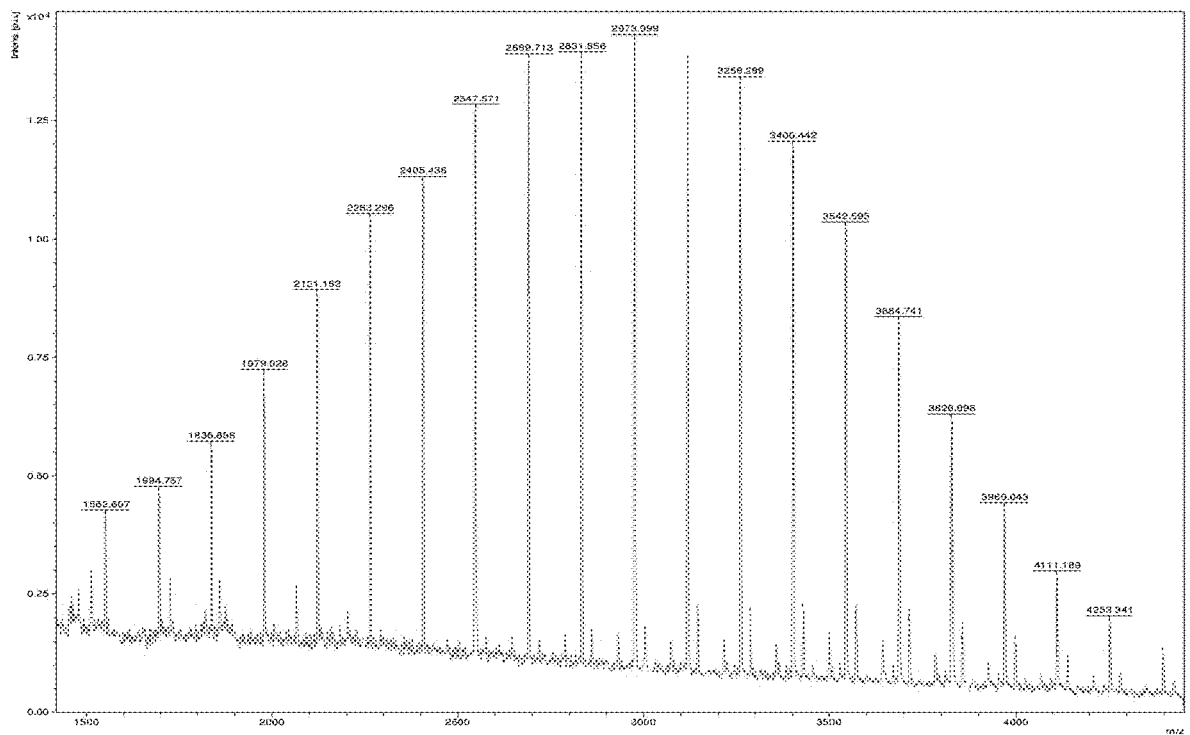
FIG. 5B illustrates a graphical view of MALDI-tof characterization of prepared poly(cyclohexene carbonate) initiated by Lithium benzoxide and catalyzed by triisobutyl aluminum, according to one or more embodiments of this disclosure.
Figure 6A:
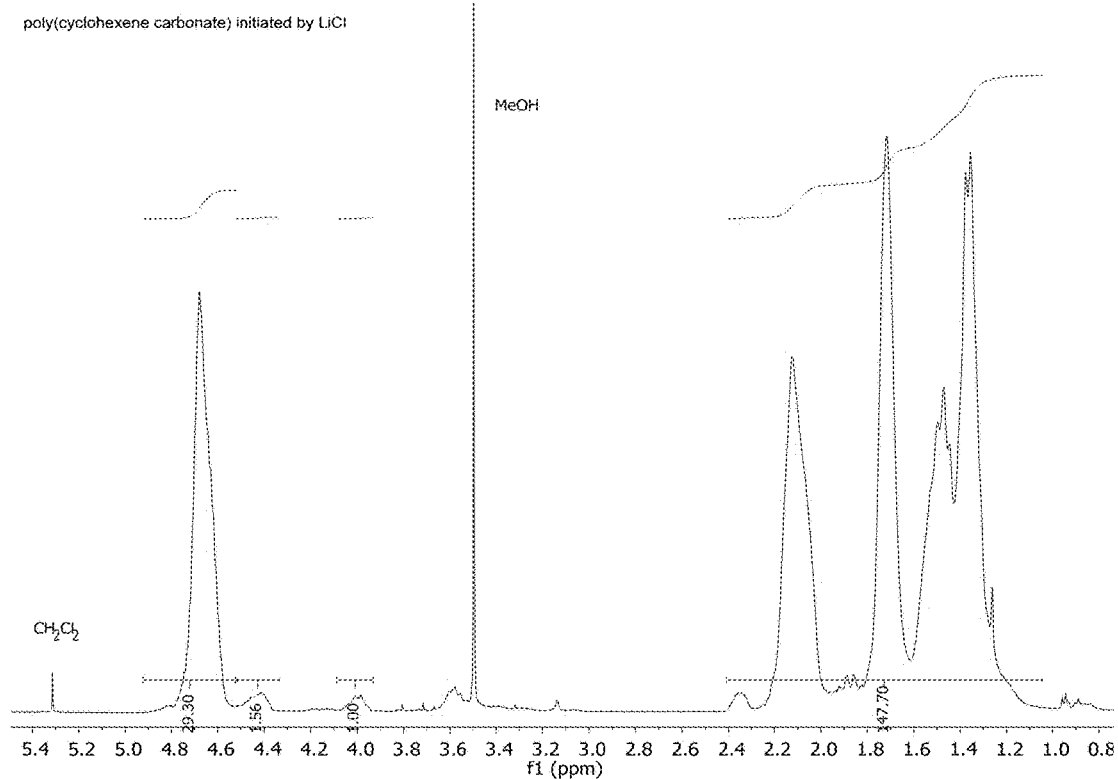
FIG. 6A illustrates a graphical view of NMR characterization of prepared poly(cyclohexene carbonate) initiated by Lithium chloride and catalyzed by triisobutyl aluminum, according to one or more embodiments of this disclosure.
Figure 6B:
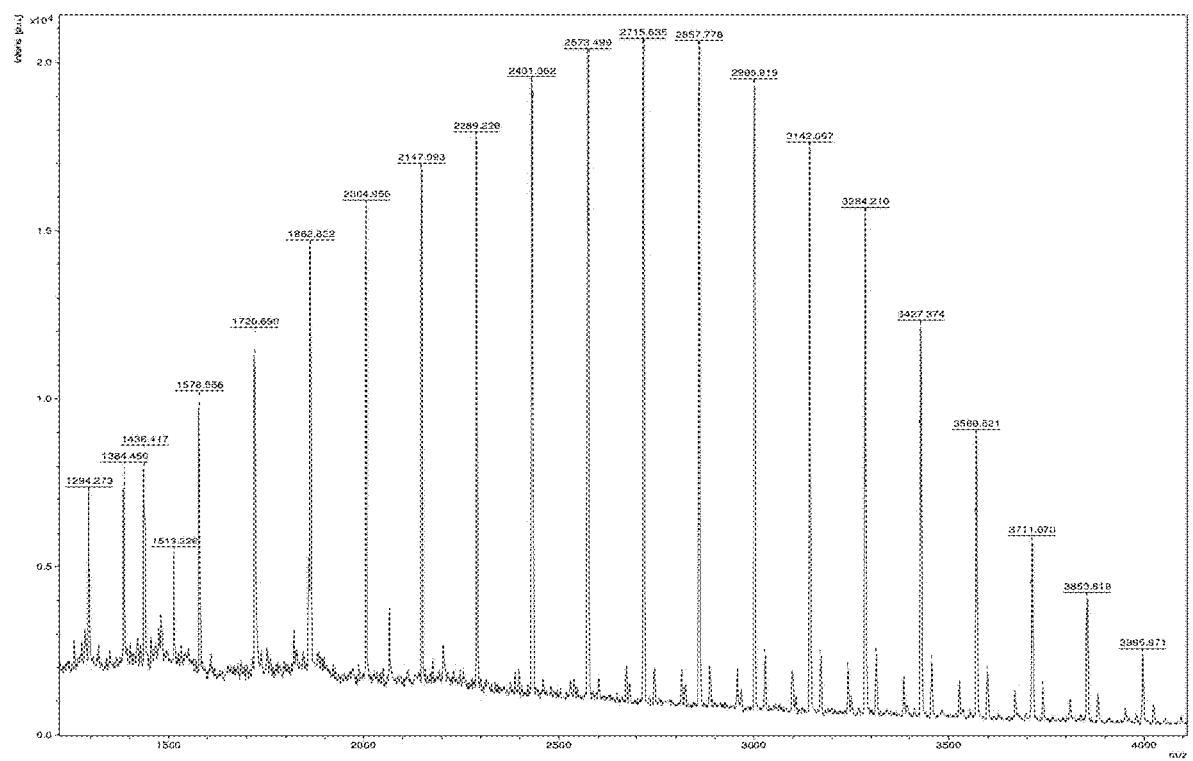
FIG. 6B illustrates a graphical view of MALDI-tof characterization of prepared poly(cyclohexene carbonate) initiated by Lithium chloride and catalyzed by triisobutyl aluminum, according to one or more embodiments of this disclosure.
Figure 7A:
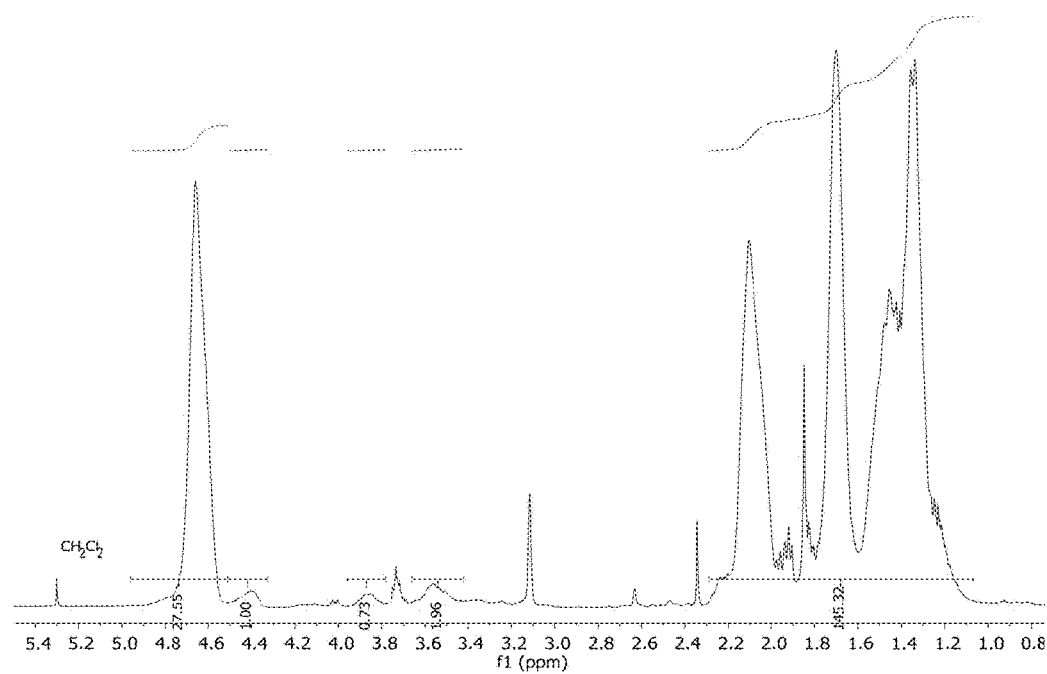
FIG. 7A illustrates a graphical view of NMR characterization of prepared poly(cyclohexene carbonate) initiated by Lithium bromide and catalyzed by triisobutyl aluminum, according to one or more embodiments of this disclosure.
Figure 7B:
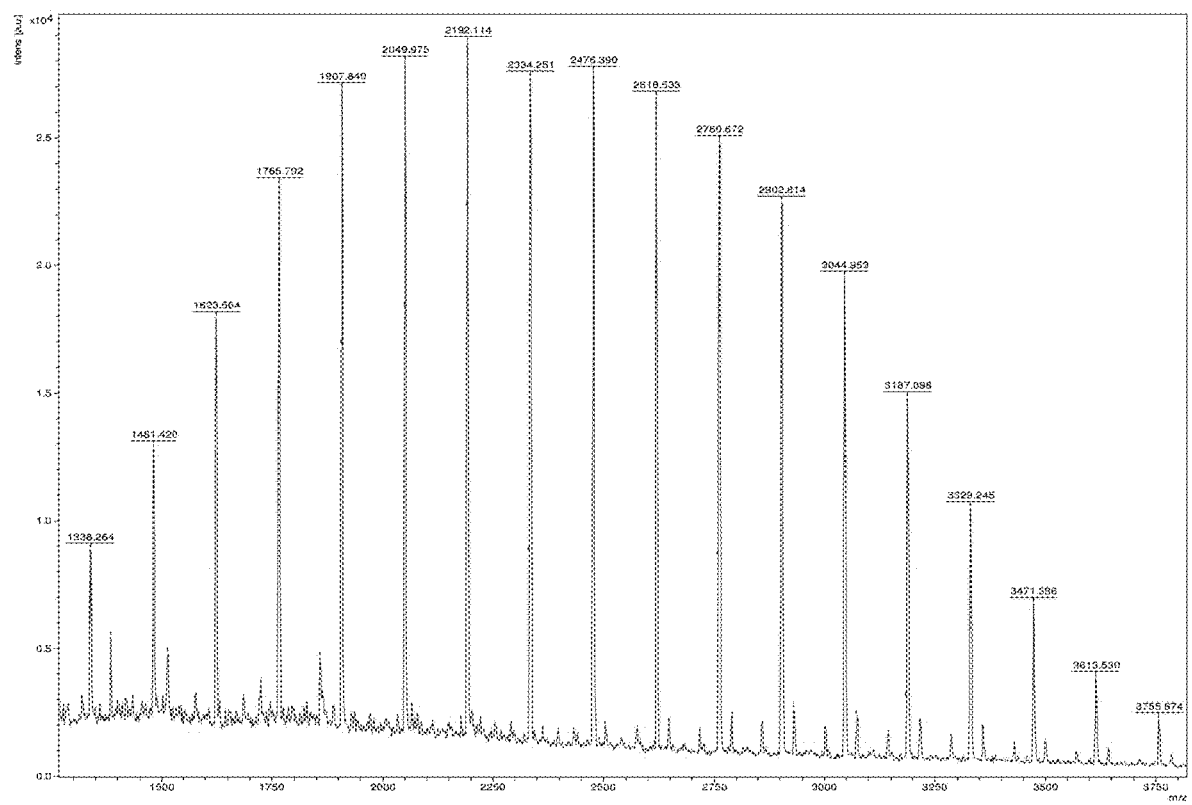
FIG. 7B illustrates a graphical view of MALDI-tof characterization of prepared poly(cyclohexene carbonate) initiated by Lithium bromide and catalyzed by triisobutyl aluminum, according to one or more embodiments of this disclosure.
Figure 8:
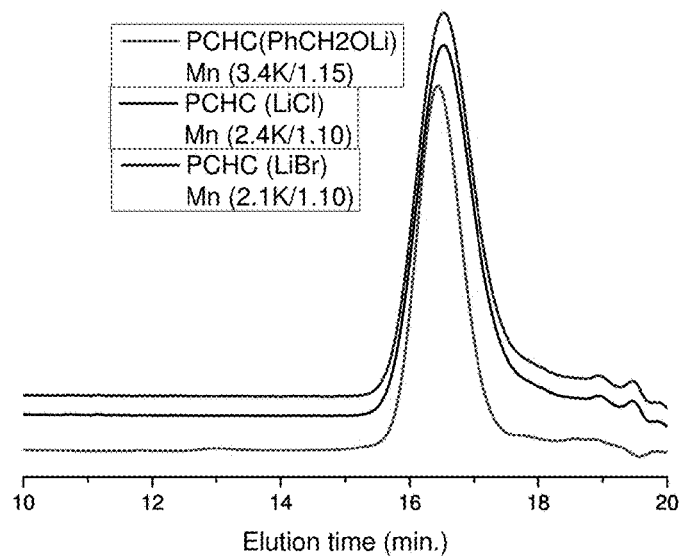
FIG. 8 illustrates a graphical overlay view of a gel permeation chromatography (GPC) characterization of prepared poly(cyclohexene carbonate) initiated by lithium salts and catalyzed by triisobutyl aluminum, according to one or more embodiments of this disclosure.
Figure 9:
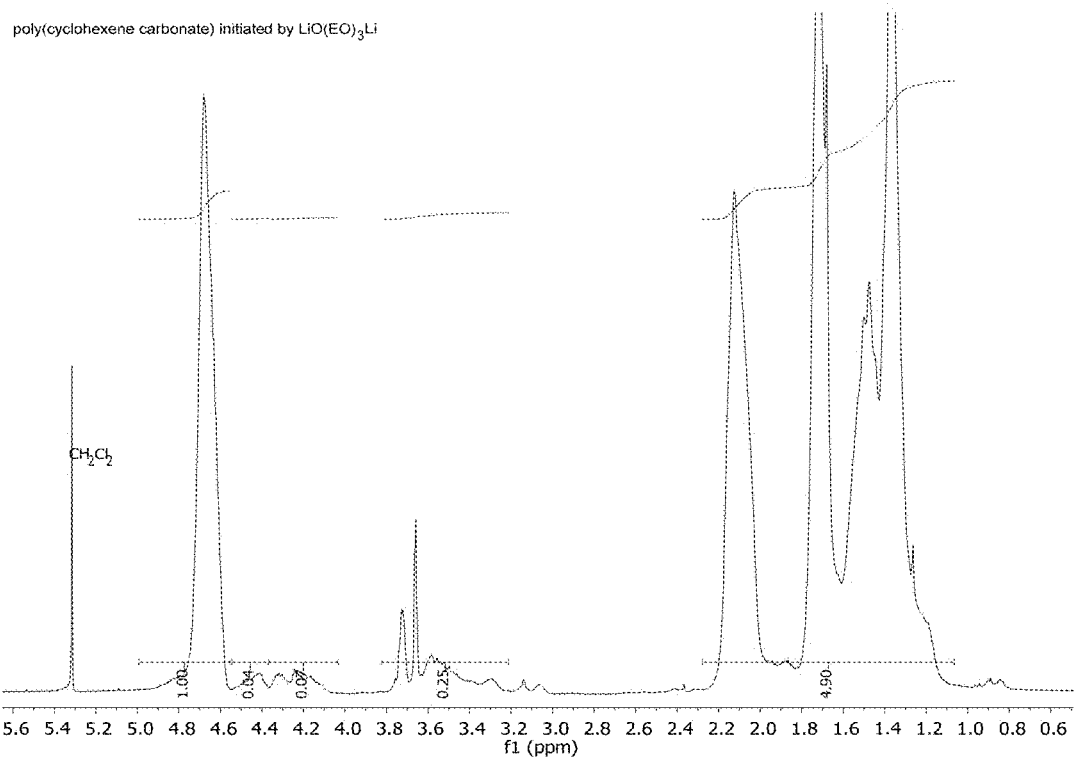
FIG. 9 illustrates a graphical view of NMR characterization of prepared poly(cyclohexene carbonate) initiated by Lithium triethylene glycoxide and catalyzed by triisobutyl aluminum, according to one or more embodiments of this disclosure.
Figure 10:
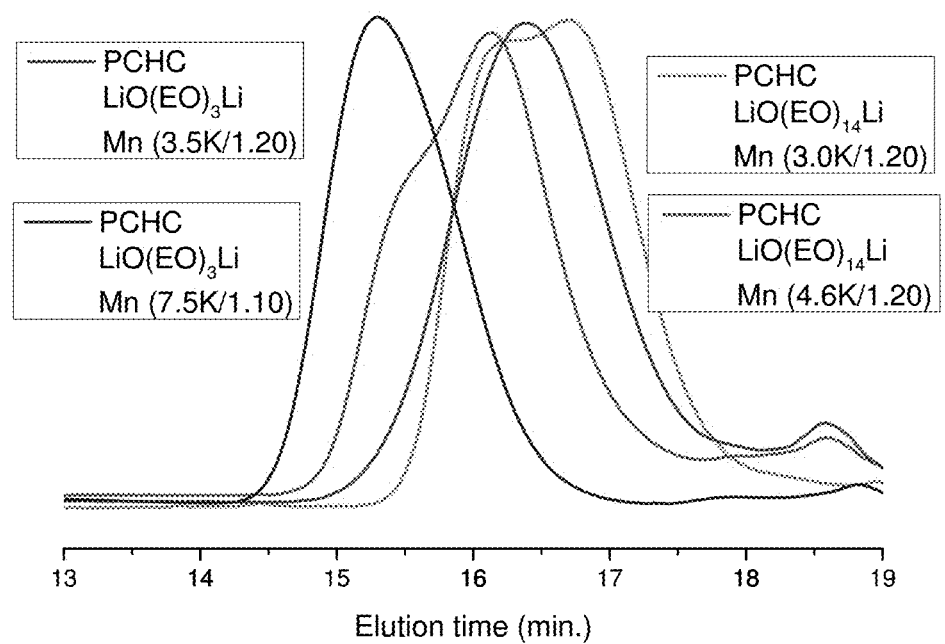
FIG. 10 illustrates a graphical overlay view of a gel permeation chromatography (GPC) characterization of prepared poly(cyclohexene carbonate) initiated by lithium glycoxides and catalyzed by triisobutyl aluminum, according to one or more embodiments of this disclosure.
Figure 11:
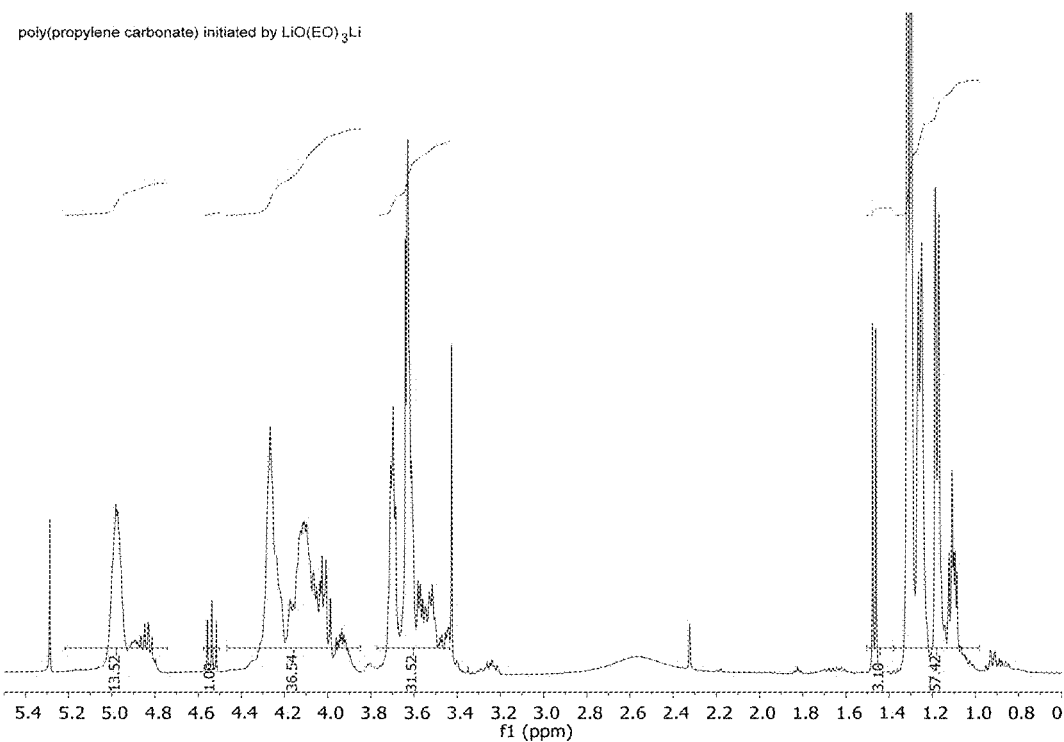
FIG. 11 illustrates a graphical view of NMR characterization of prepared poly(propylene carbonate)initiated by Lithium triethylene glycoxide and catalyzed by triisobutyl aluminum, according to one or more embodiments of this disclosure.
Figure 12:
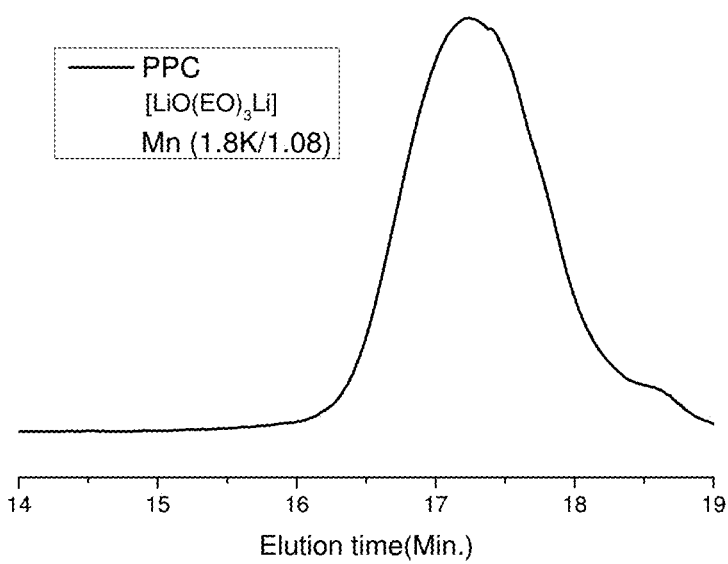
FIG. 12 illustrates a graphical view of a gel permeation chromatography (GPC) characterization of prepared poly(propylene carbonate) initiated by lithium triethylene glycoxides and catalyzed by triisobutyl aluminum, according to one or more embodiments of this disclosure.

A representative procedure of $CO_2$ copolymerization of propylene oxide with imidazolium salt catalyzed by triisobutyl aluminum was performed. Inside a glove box under argon, to a pre-dried 50 mL of autoclave fitted with magnetic stirring bar, 16 mg of 1,3-diisopropylimidazolium chloride (86 μmol) was added followed by 0.3 g of propylene carbonate. After the imidazolium salt was completely dissolved, 123 mg of ionic liquid (5 eq.), 1-butyl-3-methylimidazolium hexaflurophosphate and triisobutyl aluminum in toluene (103 μmol) were added into the autoclave. To prevent homopolymerization before charging $CO_2$, 1.5 mL of propylene oxide was charged into a separate small vial which was put inside the autoclave. $CO_2$ was charged into the sealed autoclave to 10 bar. Then, copolymerization was carried out under stirring at 60° C. after the propylene oxide was mixed through vigorous shaking. After the reaction time, the carbon dioxide was slowly vented, and quenched the reaction with drops of 10% HCl. The reaction mixture was precipitated into excess of water to remove propylene carbonate. Toluene was used to extract the precipitate to remove the added ionic liquid. The organic solution was concentrated and dried for characterization. The results were listed in Table 2. The obtained polycarbonates (non-quenched polymer crude mixture) did not exhibit degradation phenomena characterized by IR (see FIG. 4 illustrating a graphical view of an infrared (IR) degradation test of prepared polymer initiated by imidazolium chloride, according to one or more embodiments of this disclosure).

TABLE 2

Random poly(propylene carbonate) copolymer initiated by imidazolium chloride

| EXP | Initiator (1.0) | iBu3Al (Eq.) | IL (Eq.) | solvent | PO | CO2 (atm) | Temp. | time | Conv. (% PO) | PPC (mol %) | Selectivity (%) | GPC (×10³) |
|-----|-----------------|--------------|----------|---------|-------|-----------|-------|------|--------------|-------------|-----------------|------------|
| 23  | Pr2ImCl         | 1.2          | 5        | CPC     | 12.3M | 10        | 60    | 16   | 90           | 33          | nd              | 2.55/1.28  |
| 24  | Pr2ImCl         | 1.2          | 20       | CPC     | 12.3M | 10        | 60    | 16   | 56           | 36          | nd              | 4.67/1.59  |
| 25  | Pr2ImCl         | 1.2          | 0        | CPC     | 13.6M | 15        | 60    | 3 ds | 42           |             | nd              | 22.0/1.12  |
| 26  | Pr2ImCl         | 1.1          | 5        | CPC     | 12.3M | 10        | 60    | 16   | 77           | 34          | nd              | 6.48/1.58  |

EXAMPLE 3

A representative procedure of $CO_2$ copolymerization of cyclohexene oxide with lithium salts catalyzed by triisobutyl aluminum was performed. Inside a glove box under argon, to a pre-dried 50 mL of autoclave fitted with magnetic stirring bar, 93 mg of 2-phenyl ethanol (0.74 mmol) was added followed by 1.5 mL of THF. Butyllithium in toluene (0.74 mmol) was added to deprotonate the alcohol. Ten minutes later, triisobutyl aluminum in toluene (0.20 mmol) were added into the autoclave. To prevent homopolymerization before charging $CO_2$, 1.5 mL of cyclohexene oxide was charged into a separate small vial which was put inside the autoclave. $CO_2$ was charged into the sealed autoclave to 10 bar. Then, copolymerization was carried out under vigorous stirring at 80° C. After the reaction time, the carbon dioxide slowly vented, and the reaction quenched with drops of 10% HCl. Dichloromathane was used to extract the polymer. The organic solution was concentrated and precipitated in methanol. The results were listed in Table 3, FIG. 5-12.

TABLE 3 polycarbonate initiated by lithium salts

| EXP | Initiator (mol/L) | iBu3Al (mol/L) | Li salt additive (Eq.) | solvent | Epoxide | CO2 (atm) | Temp. | time | Yield (%) | PC mol (%) | Selectivity (%) | GPC (×10³) |
|---|---|---|---|---|---|---|---|---|---|---|---|---|
| 27 | BzOLi (0.25) | 0.066 | 0 | THF | CHO (5.0M) | 10 | 80 | 16 | 84 | 99 | >99 | 3.4/1.10 |
| 24 | BzOLi (0.10) | 0.025 | 0 | Tol | CHO (5.0M) | 10 | 80 | 16 | 11 | 25 | >99 | 2.0/1.20 |
| 25 | BzOLi (0.10) | 0.025 | 0 | THF | CHO (5.0M) | 10 | 60 | 16 | 13 | 91 | >99 | 5.3/1.10 |
| 26 | BzOLi (0.10) | 0.066 | 0 | THF | CHO (5.0M) | 10 | 60 | 16 | 73 | 88 | >99 | 4.0/1.10 |
| 27 | BzOLi (0.10) | 0.10 | 0 | THF | CHO (5.0M) | 10 | 60 | 16 | 78 | 29 | >99 | 5.3/1.10 |
| 28 | BzOLi (0.10) | 0.066 | CF₃SO₃Li (1.5) | THF | CHO (5.0M) | 10 | 80 | 16 | 50 | 12 | >99 | 1.2/1.30 |
| 29 | BzOLi (0.10) | 0.066 | LiF (1.5) | THF | CHO (5.0M) | 10 | 80 | 16 | 47 | 60 | >99 | 1.4/1.40 |
| 30 | LiCl (0.25) | 0.066 | 0 | THF | CHO (5.0M) | 10 | 80 | 16 | 86 | 99 | >99 | 2.4/1.10 |
| 31 | LiBr (0.25) | 0.066 | 0 | THF | CHO (5.0M) | 10 | 60 | 16 | 92 | 99 | >99 | 2.1/1.10 |
| 32 | LiO (EO)₃Li (0.25) | 0.13 | 0 | THF | CHO (5.0M) | 10 | 60 | 16 | 91 | 88 | >99 | 4.1/1.20 |
| 33 | LiO (EO)₁₄Li (0.25) | 0.13 | 0 | THF | CHO (5.0M) | 10 | 60 | 16 | 97 | 99 | >99 | 3.0/1.20 |
| 34 | PSt-CH2CH2OLi (0.25) | 0.066 | 0 | THF | CHO (5.0M) | 10 | 60 | 16 | 90 | 95 | >99 | 4.1/1.10 |
| 35 | LiO (EO)₃Li (0.18) | 0.094 | 0 | THF | PO(7.2M) | 10 | r.t. | 16 | 25 | 61 | 94 | 1.8/1.08 |

EXAMPLE 4

Figure 13:
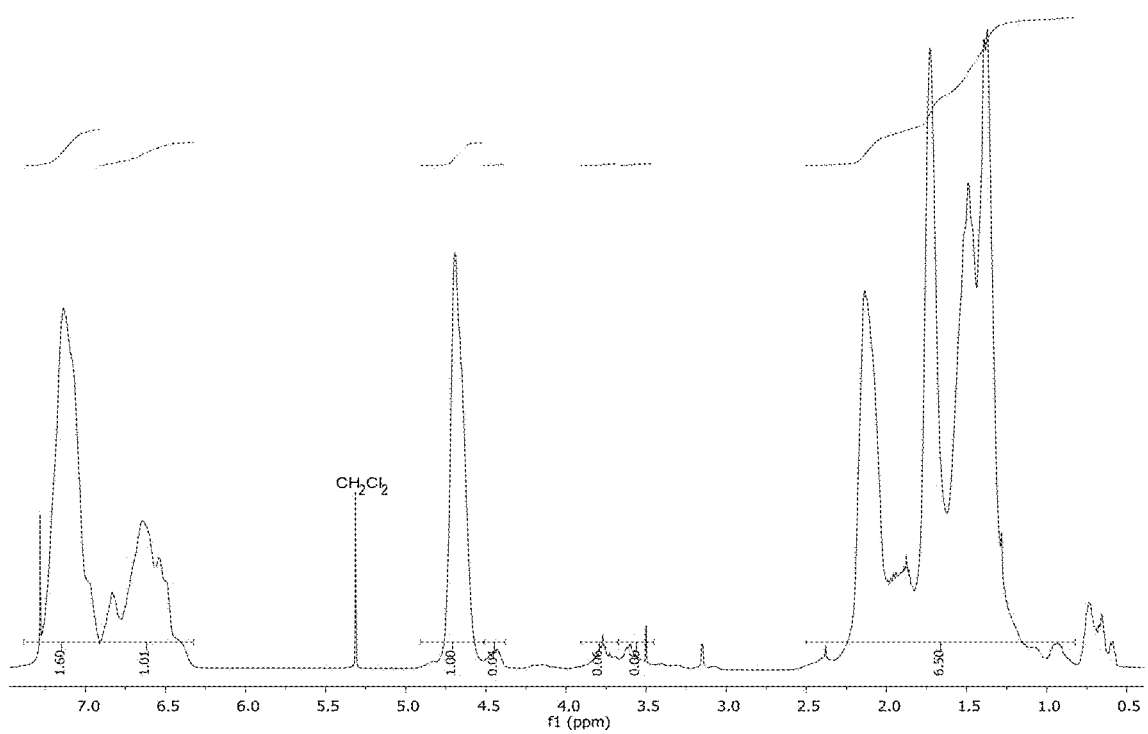
FIG. 13 illustrates a graphical view of NMR characterization of prepared polymer initiated by Lithium polystyrene and catalyzed by triisobutyl aluminum, according to one or more embodiments of this disclosure.
Figure 14:
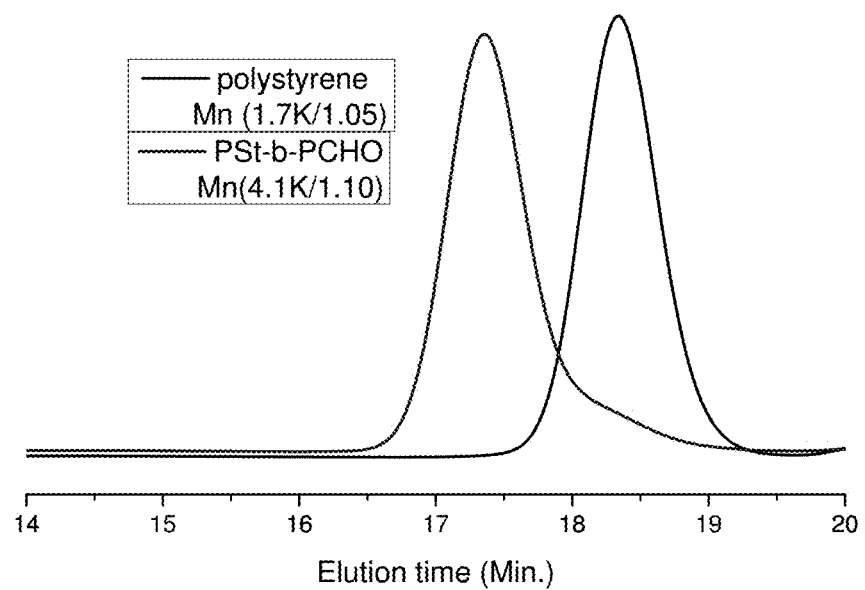
FIG. 14 illustrates a graphical overlay view of a gel permeation chromatography (GPC) characterization of prepared polymers initiated by lithium polystyrene and catalyzed by triisobutyl aluminum, according to one or more embodiments of this disclosure.
Figure 15:
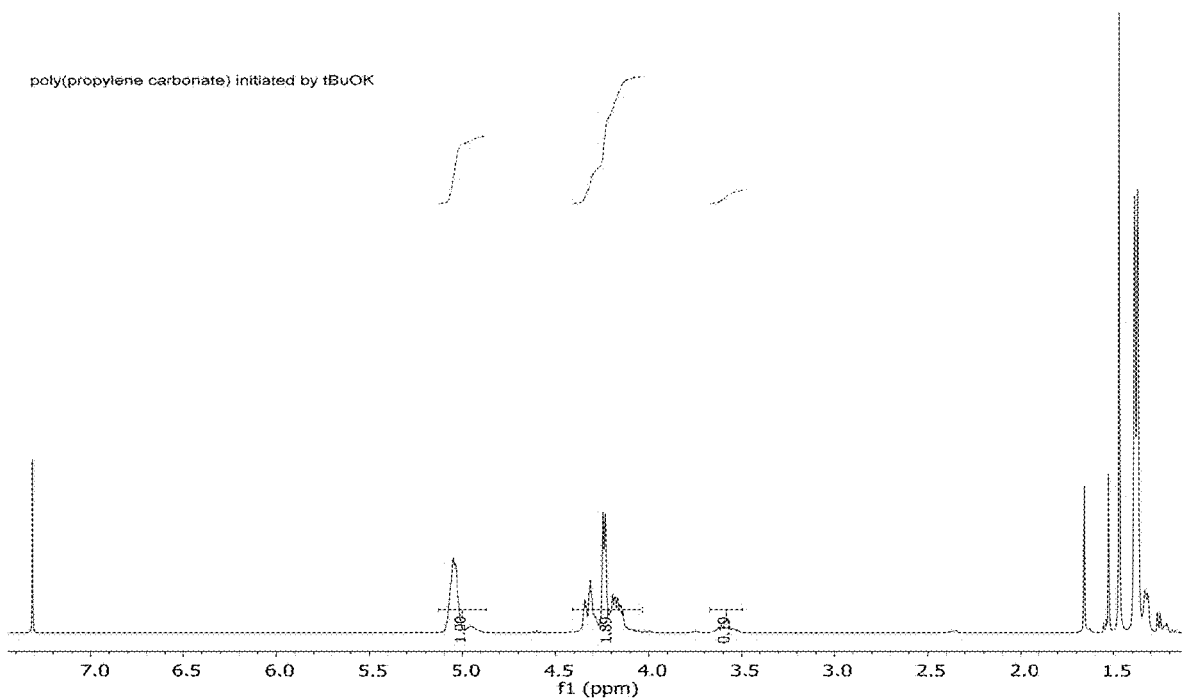
FIG. 15 illustrates a graphical view of NMR characterization of prepared polymer initiated by potassium tertbutyloxide and catalyzed by triethyl borane, according to one or more embodiments of this disclosure.
Figure 16:
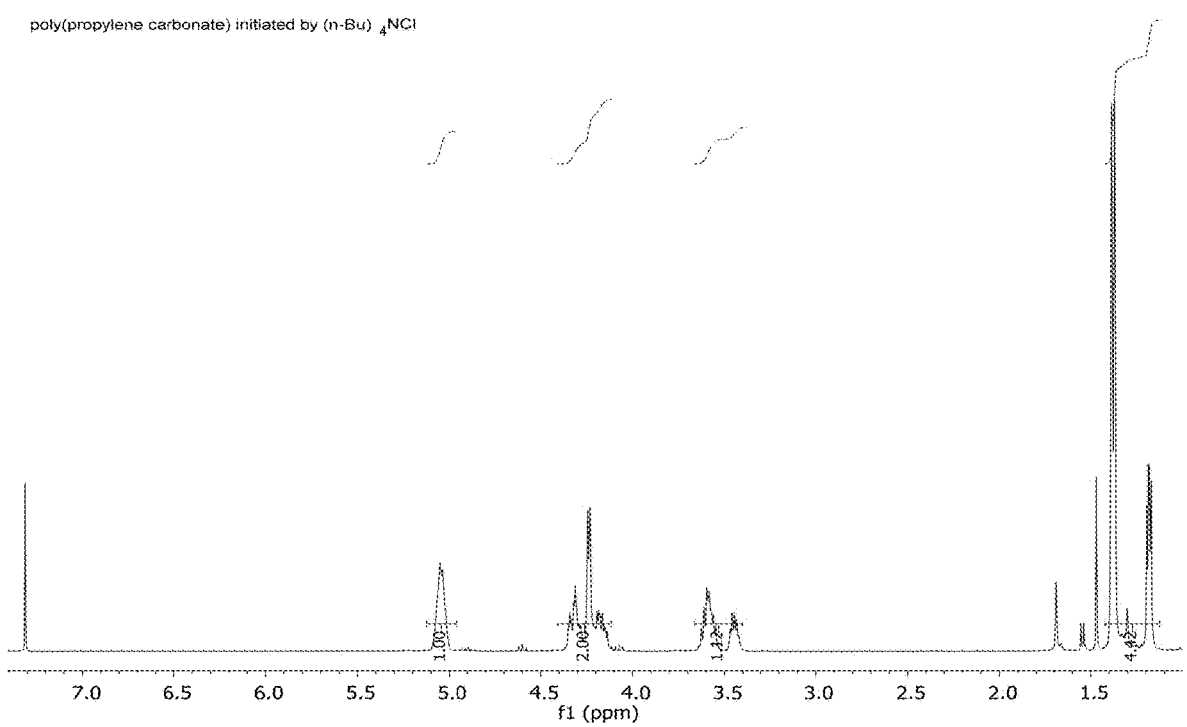
FIG. 16 illustrates a graphical view of NMR characterization of prepared polymer initiated by tetrabutylammonium chloride and catalyzed by triethyl borane, according to one or more embodiments of this disclosure.
Figure 17:
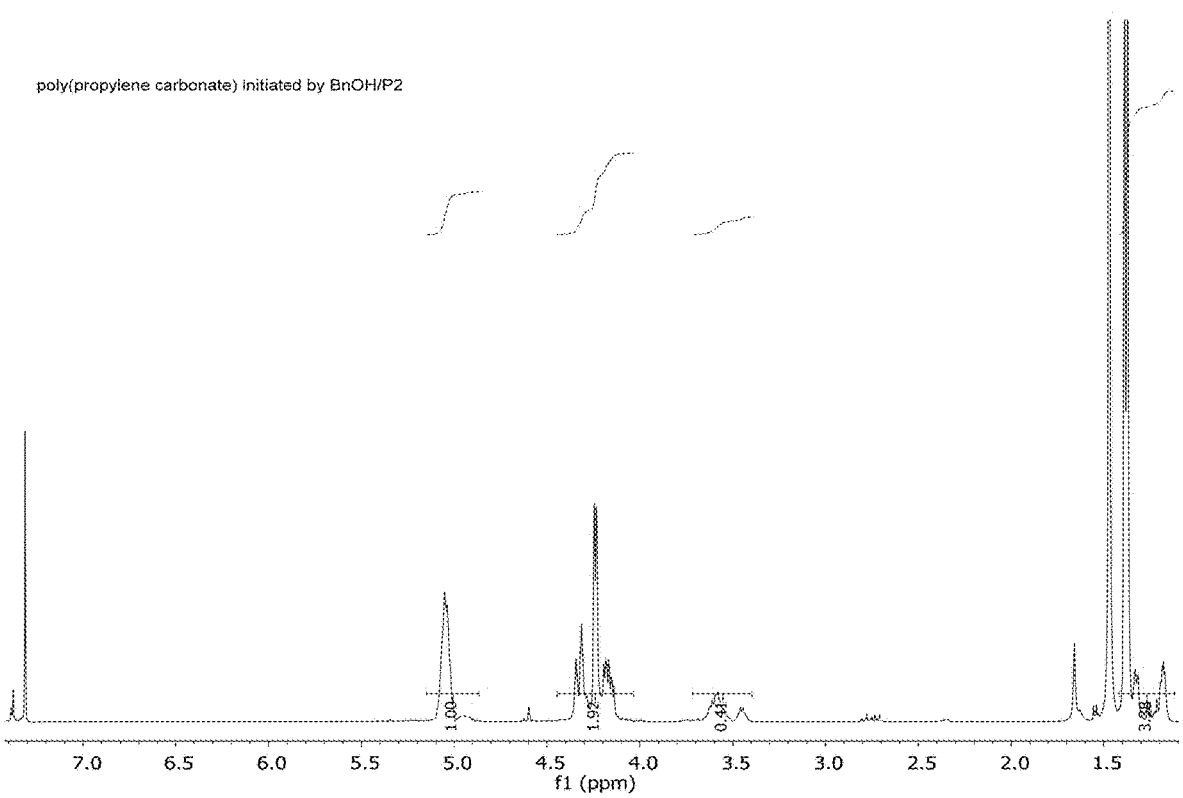
FIG. 17 illustrates a graphical view of NMR characterization of prepared polymer initiated by benzene alcohol and phosphazene P2 and catalyzed by triethyl borane, according to one or more embodiments of this disclosure.
Figure 18:
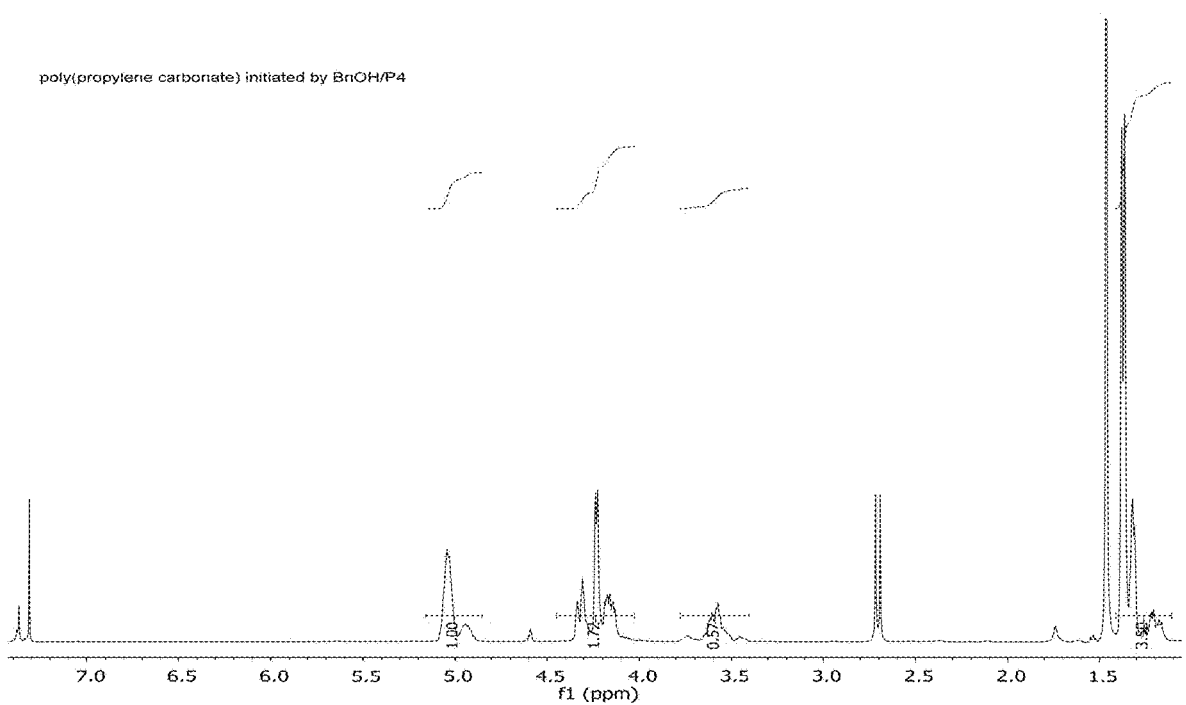
FIG. 18 illustrates a graphical view of NMR characterization of prepared polymer initiated by benzene alcohol and phosphazene P4 and catalyzed by triethyl borane, according to one or more embodiments of this disclosure.

A representative procedure of $CO_2$ copolymerization of cyclohexene oxide with macromolecular lithium salts catalyzed by triisobutyl aluminum was performed. Inside a glove box under argon, to a pre-dried 50 mL of autoclave fitted with magnetic stirring bar, 93 mg of 2-phenyl ethanol (0.74 mmol) was added followed by 1.5 mL of THF. Butyllithium in toluene (0.74 mmol) was added to deprotonate the alcohol. Ten minutes later, triisobutyl aluminum in toluene (0.20 mmol) were added into the autoclave. To prevent homopolymerization before charging CO2, 1.5 mL of cyclohexene oxide was charged into a separate small vial which was put inside the autoclave. $CO_2$ was charged into the sealed autoclave to 10 bar. Then, copolymerization was carried out under vigorous stirring at 80° C. After the reaction time, the carbon dioxide slowly vented, and the reaction quenched with drops of 10% HCl. Dichloromathane was used to extract the polymer. The organic solution was concentrated and precipitated in methanol. The results were listed in Table 3, FIG. 13, 14.

EXAMPLE 5

A representative procedure of $CO_2$ copolymerization of propylene oxide catalyzed by triethylborane was performed. Inside a glove box under argon, to a pre-dried 50 mL of autoclave fitted with magnetic stirring bar, 9.6 mg of potassium tert-butyloxide (86 pmol) was added followed by triethylborane solution in THF (172 μmol) and propylene oxide (3 mL, 43 mmol). $CO_2$ was charged into the sealed autoclave to 10 bar. Then, copolymerization was carried out under stirring at 60° C. After the reaction time for 16 hours, the carbon dioxide was slowly vented, and quenched the reaction with drops of 10% HCl. Dichloromathane was used to extract the polymer. The organic solution was concentrated and the polymer was obtained after precipitation in cyclohexene or cold methanol. The results were listed in Table 4. (see FIG. 15-18, 20).

EXAMPLE 6

Figure 19:
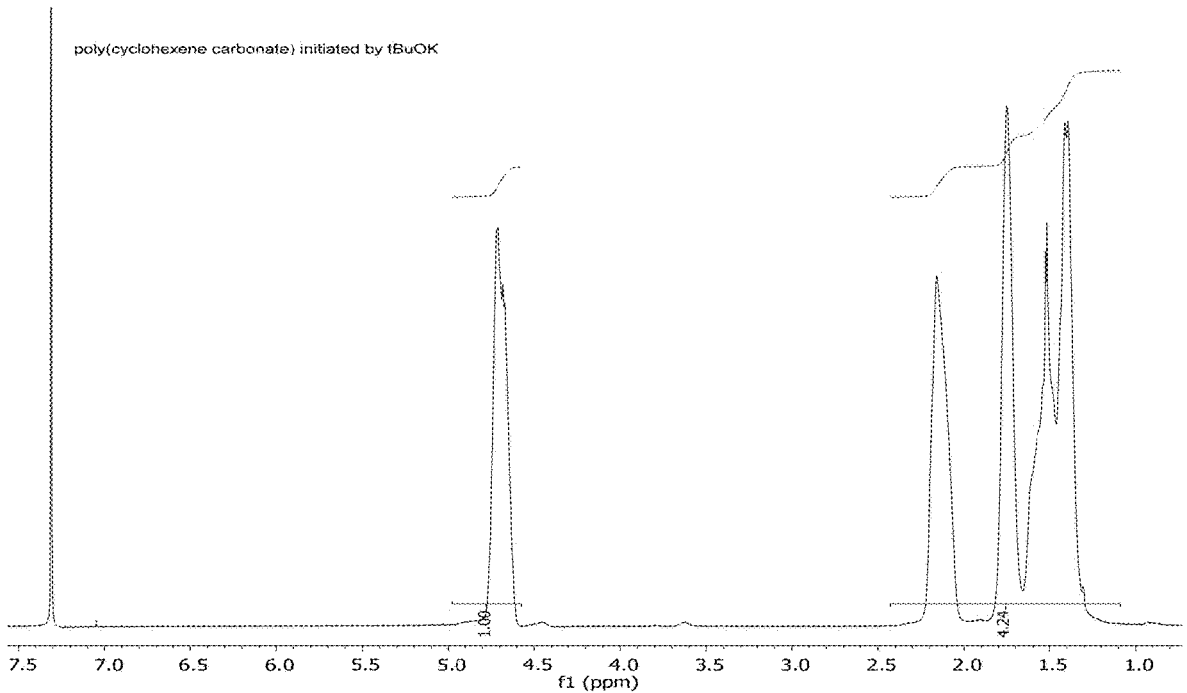
FIG. 19 illustrates a graphical view of NMR characterization of prepared poly(cyclohexene carbonate) initiated by potassium tertbutyloxide and catalyzed by triethyl borane, according to one or more embodiments of this disclosure.
Figure 20:
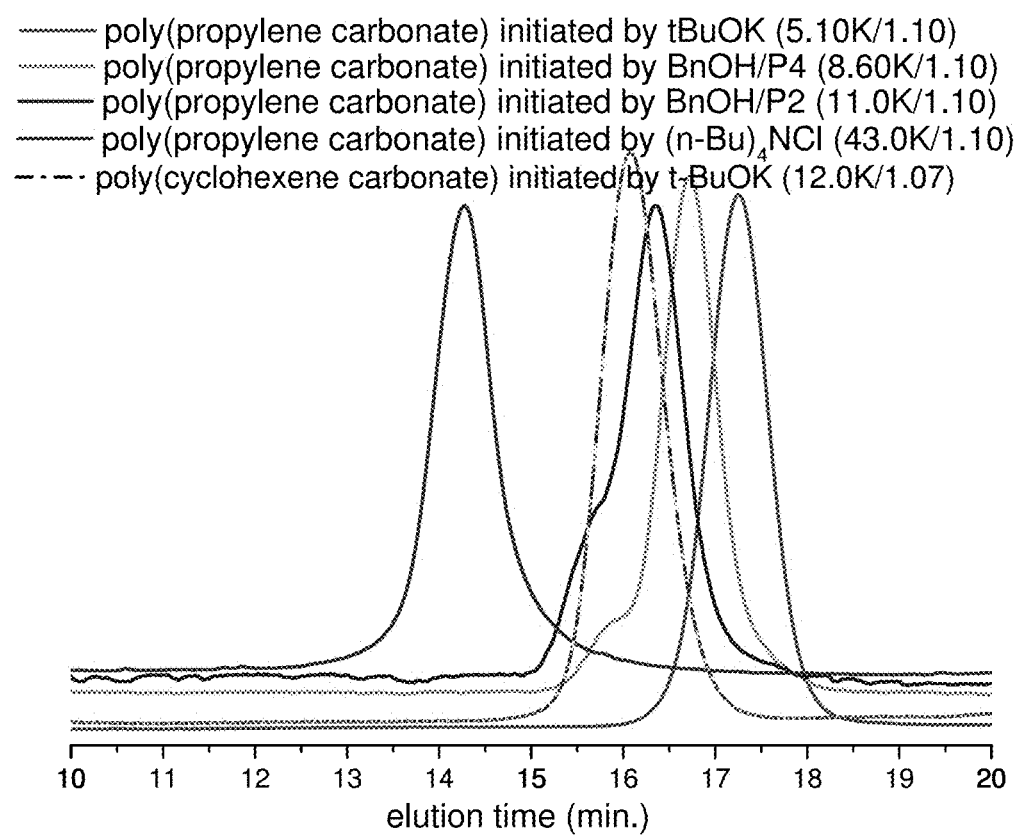
FIG. 20 illustrates a graphical overlay view of a gel permeation chromatography (GPC) characterization of prepared poly(propylene carbonate) and poly(cyclohexene carbonate) polymers catalyzed by triethylborane, according to one or more embodiments of this disclosure.

A representative procedure of CO2 copolymerization of cyclohexene oxide catalyzed by triethylborane was performed. Inside a glove box under argon, to a pre-dried 50 mL of autoclave fitted with magnetic stirring bar, 45 mg of potassium tert-butyloxide (40 μmol) was added followed by 3.0 mL of THF, triethylborane (80 umol), and 3.0 mL of cyclohexene oxide. CO2 was charged into the sealed autoclave to 10 bar. Then, copolymerization was carried out under vigorous stirring at 80° C. After the reaction time, the carbon dioxide slowly vented, and the reaction quenched with drops of 10% HCl. Dichloromathane was used to dissolve and dilute the polymer. The polymer was obtained through precipitation in cold methanol. The results were listed in Table 4, FIG. 19-20.

TABLE 4

Supplementary data of copolymerization of CO2 and epoxide in the presence of boron Lewis acids.

| EXP* | Initiator (mol/L) | Et₃B (mol/L) | solvent | Epoxide | CO2 (atm) | Temp. | time | Yield (%) | PC (mol %) | Selectivity (%) | GPC (×10³) |
|---|---|---|---|---|---|---|---|---|---|---|---|
| 27 | t-BuOK (0.28) | 0.56 | — | PO, bulk | 10 | 60 | 16 h | 93 | 94 | 97 | 5.10/1.10 |
| 28 | (Bu)₄NCl (0.14) | 0.28 | — | PO, bulk | 10 | 60 | 16 h | 85 | 82 | 95 | 9.00/1.10 |
| 29 | (Bu)₄NCl (0.028) | 0.056 | — | PO, bulk | 10 | 60 | 16 h | 80 | 73 | 94 | 43.0/1.10 |
| 30 | (Bu)₄NCl (0.014) | 0.028 | — | PO, bulk | 10 | 60 | 16 h | 59 | 83 | 78 | 40.0/1.10 |
| 31 | (Bu)₄NCl (0.028) | 0.056 | toluene | PO, 7.2M | 10 | 60 | 16 h | 62 | 73 | 85 | 33.0/1.20 |
| 32 | BnOH/P2 (0.07) | 0.014 | THF | PO, 7.2M | 10 | 60 | 16 h | 93 | 88 | 96 | 11.0/1.20 |
| 33 | BnOHH/P4 0.14) | 0.28 | THF | PO, 7.2M | 10 | 60 | 16 h | 95 | 85 | 95 | 8.60/1.10 |
| 34 | t-BuOK (0.067) | 0.13 | THF | CHO, 5.0M | 10 | 80 | 16 h | 93 | >99 | >99% | 12.0K/1.07 |

The present invention is described with reference to the attached figures, wherein like reference numerals are used throughout the figures to designate similar or equivalent elements. The figures are not drawn to scale and they are provided merely to illustrate the invention. Several aspects of the invention are described with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

What is claimed is:

1. A method of making a polycarbonate, comprising:
   contacting one or more cyclic monomers and carbon dioxide in the presence of one or more of a Lewis acid catalyst, an initiator, and an ionic liquid,
   wherein the Lewis acid catalyst comprises trialkyl aluminum; and
   agitating, sufficient to copolymerize the one or more cyclic monomers and carbon dioxide to create a polycarbonate.

2. The method of claim 1, wherein the one or more cyclic monomers comprises one or more epoxides.

3. The method of claim 1, wherein the one or more cyclic monomers comprises one or more of lactide, caprolactone, propylene oxide, cyclohexene oxide, ethylene oxide, and styrene oxide.

4. The method of claim 1, wherein the Lewis acid catalyst comprises triisobutyl aluminum.

5. The method of claim 1, wherein the initiator includes one or more of a mono- and/or poly-alcoholic, phenolic, and acidic salts with cations produced through deprotonation by different bases, salts, and/or other lithium salts additives,
   wherein the cations include one or more of lithium, sodium, potassium, cesium, ammonium, imidazolium, phosphazium, and phosphonium,
   wherein the bases include one or more of imidazolium alkoxide, lithium alkoxide, lithium phenolate, and alkyllithium (including macromolecular alkoxide),
   wherein the salts include one or more of imidazolium lithium, sodium, potassium, ammonium, tetraalkylammonium, tetraalkylphosphonium in halide, hydroxide, carbonate, and carboxylate,
   wherein the other lithium salts additives include one or more of lithium carbonate, LiOH, LiCO3, LiClO4, LiPF6, LiBF4, and lithium bis(trifluoromethane)sulfonamide.

6. The method of claim 1, wherein the initiator includes one or more of lithium salts, imidazolium salts, and alkoxide salts.

7. The method of claim 1, wherein the initiator includes one or more of lithium benzoxide, lithium chloride, lithium bromide, lithium triethylene glycoxide, lithium glycoxide, lithium polystyrene, n-heterocyclic carbene, imidazolium chloride, potassium tertbutyloxide, tetrabutylammonium chloride, bis(triphenylphosphine)iminium chloride, tetrabutylphosphonium chloride, tetraphenylphosphonium chloride, and benzene alcohol and phosphazene P4.

8. The method of claim 1, wherein the one or more ionic liquids include one or more of:
   1) Imidazolium-based ionic liquids with different counter ion, including one or more of 3-Methyl-(4-9)-(fluoro) imidazolium Bis[(trifluoromethyl)sulfonyl]imide, 1-hexyl-3-methylimidazolium tris(penta fluoro propyl) trifluoro phosphate and 1-pentyl-3-methyl imidazolium tris(nona fluoro butyl)] trifluoro-phosphate;
   2) Ammonium-based ionic liquids with different counter ions, including one or more of choline bis(trifluoromethylsulfonyl)imide, tetrabutyl ammonium docusate, peg-5 -cocomonium methylsulphate;
   3) Super-based derived protonic ionic liquids, including one or more of Methyl-triaza bicycloundacane (MTBD) and trifluoroethanol [MTBDH+] [TFE−]; and
   4) Polyionic liquids, including one or more of poly(1-[(2-methacryloyloxy)ethyl]-3-butylimidazoliums, poly(1-ethyl-3-vinyl-imidazolium) bis(trifluoromethylsulfonyl) imide, N,N-dimetyl-N,N-diallylammonium bis (trifluoromethylsulfonyl) imide and poly (diallyldimethylammonium chloride) solution].

9. The method of claim 1, wherein the ionic liquid includes one or more of 1-butyl-3-methylimidazolium hexaflurophosphate and trioctylmethylammonium bis(trifluoromethyl-sulfonyl)imide.

10. The method of claim 1, wherein agitating comprises stirring.

11. A method of controlling a polymer composition, comprising:
    contacting one or more cyclic monomers and carbon dioxide in the presence of one or more a Lewis acid catalyst, an ionic liquid, and an initiator, wherein the Lewis acid catalyst comprises trialkyl aluminum;
    adjusting pressure of carbon dioxide, an amount of one or more of the Lewis acid catalyst, ionic liquid, and initiator sufficient to selectively modify a resulting polycarbonate; and
    agitating, sufficient to copolymerize the one or more cyclic monomers and carbon dioxide to create the polycarbonate.

12. The method of claim 11, wherein adjusting comprises adding an excess.

13. The method of claim 11, wherein adjusting comprises modifying one or more ratios of catalyst/ionic liquid, catalyst/initiator, catalyst/cyclic monomers, ionic liquid/cyclic monomer and initiator/cyclic monomer, polymerization pressure (1 atm to 50 atm) and temperature (ambient temperature to 120° C.).

14. The method of claim 11, wherein selectively modifying includes one or more of modifying a ratio of blocks, modifying a gradient, introducing a terminal functional group, copolymerizing with other macromolecular initiates, affecting randomness of blocks, and altering a structure.

15. The method of claim 11, wherein the one or more cyclic monomers comprises one or more epoxides.

16. The method of claim 11, wherein the one or more cyclic monomers comprises one or more of lactide, caprolactone, propylene oxide, and cyclohexene oxide, ethylene oxide, styrene oxide.

17. The method of claim 11, wherein the initiator includes one or more of lithium benzoxide, lithium chloride, lithium bromide, lithium triethylene glycoxide, lithium glycoxide, lithium polystyrene, n-heterocyclic carbene, imidazolium chloride, potassium tertbutyloxide, tetrabutylammonium chloride, tetrabutylphosphonium chloride, tetraphenylphosphonium chloride, and benzene alcohol and phosphazene P4.

18. The method of claim 11, wherein the one or more ionic liquids includes one or more of:
    1) Imidazolium-based ionic liquids with different counter ions including one or more of: 3 -Methyl-(4-9)-(fluoro) imidazolium Bis[(trifluoromethyl)sulfonyl]imide, 1-hexyl-3-methylimidazolium tris(penta fluoro propyl) trifluoro phosphate and 1-pentyl-3-methyl imidazolium tris(nona fluoro butyl)] trifluoro-phosphate;

2) Ammonium-based ionic liquids with different counter ions including one or more of choline bis(trifluoromethylsulfonyl)imide, tetrabutyl ammonium docusate, peg-5-cocomonium methylsulphate;
3) Super-based derived protonic ionic liquids including one or more of Methyl-triaza bicycloundacane (MTBD) and trifluoroethanol [MTBDH+] [TFE−]; and
4) Polyionic liquids including one or more of poly(1-[(2-methacryloyloxy)ethyl]-3-butylimidazoliums, poly(1-ethyl-3-vinyl-imidazolium) bis(trifluoromethylsulfonyl) imide, N,N-dimetyl-N,N-diallylammonium bis(trifluoromethylsulfonyl) imide and poly(diallyldimethylammonium chloride) solution.

\* \* \* \* \*